(12) United States Patent
Chung et al.

(10) Patent No.: US 8,245,612 B2
(45) Date of Patent: Aug. 21, 2012

(54) TABLE SAW WITH SWING ARM SUPPORT

(75) Inventors: Brian Hyuk Joon Chung, Schaumburg, IL (US); Amit K. Mehta, Barrington, IL (US)

(73) Assignee: Robert Bosch GmbH, Stuttgart (DE)

( * ) Notice: Subject to any disclaimer, the term of this patent is extended or adjusted under 35 U.S.C. 154(b) by 434 days.

(21) Appl. No.: 12/548,156

(22) Filed: Aug. 26, 2009

(65) Prior Publication Data

US 2011/0048191 A1 Mar. 3, 2011

(51) Int. Cl.
*B23D 45/06* (2006.01)
*B27G 19/02* (2006.01)
*B26D 7/22* (2006.01)

(52) U.S. Cl. .............. 83/58; 83/477.2; 83/564

(58) Field of Classification Search ........... 83/477.2, 83/62.1, 58, 471.3, DIG. 1, 471.2, 581, 478, 83/490, 663, 781, 564; 144/384, 391, 427, 144/154.5, 356; 324/688, 661; 318/16, 480; 340/686.5, 686.6, 532

See application file for complete search history.

(56) References Cited

U.S. PATENT DOCUMENTS

| | | | |
|---|---|---|---|
| 3,036,608 A * | 5/1962 | Weber | 144/285 |
| 4,161,272 A | 7/1979 | Brockl | |
| 4,336,733 A * | 6/1982 | Macksoud | 83/477.2 |
| 4,616,447 A | 10/1986 | Haas et al. | |
| 5,676,319 A | 10/1997 | Stiggins et al. | |
| 6,536,536 B1 | 3/2003 | Gass et al. | |
| 6,813,983 B2 | 11/2004 | Gass et al. | |
| 6,826,988 B2 | 12/2004 | Gass et al. | |
| 6,834,730 B2 | 12/2004 | Gass et al. | |
| 6,857,345 B2 | 2/2005 | Gass et al. | |
| 6,877,410 B2 | 4/2005 | Gass et al. | |
| 6,880,440 B2 | 4/2005 | Gass et al. | |
| 6,920,814 B2 | 7/2005 | Gass et al. | |
| 6,922,153 B2 | 7/2005 | Pierga et al. | |
| 6,945,148 B2 | 9/2005 | Gass et al. | |
| 6,945,149 B2 | 9/2005 | Gass et al. | |

(Continued)

FOREIGN PATENT DOCUMENTS

DE 20007037 7/2000

(Continued)

OTHER PUBLICATIONS

Photograph of Mafell Erika 70Ec Pull-Push saw, downloaded Oct. 29, 2009 from http://www.maschinensucher.de/ma2/bilderanzeigen-A600704-1-english.html.

*Primary Examiner* — Ghasssem Alie
(74) *Attorney, Agent, or Firm* — Maginot, Moore & Beck

(57) ABSTRACT

A power tool in one embodiment includes a table saw with a latch hold mechanism, a swing arm pivotable about a pivot along a swing arm path, a latch movable between a first latch position whereat the swing arm is maintained at a first swing arm position and a second latch position whereat the swing arm is not maintained at the first swing arm position, an actuating device configured to transfer a force to the swing arm, at least one swing arm guide extending adjacent to the swing arm path, at least one swing arm support positioned to be in opposition to the at least one swing arm guide along the swing arm path, and a control system configured to control the actuating device to transfer a force to the swing arm sufficient to move the latch from the first latch position to the second latch position.

20 Claims, 19 Drawing Sheets

U.S. PATENT DOCUMENTS

| | | |
|---|---|---|
| 6,957,601 B2 | 10/2005 | Gass et al. |
| 6,994,004 B2 | 2/2006 | Gass et al. |
| 6,997,090 B2 | 2/2006 | Gass et al. |
| 7,000,514 B2 | 2/2006 | Gass et al. |
| 7,024,975 B2 | 4/2006 | Gass et al. |
| 7,029,384 B2 | 4/2006 | Steimel et al. |
| 7,055,417 B1 | 6/2006 | Gass |
| 7,077,039 B2 | 7/2006 | Gass et al. |
| 7,093,668 B2 | 8/2006 | Gass et al. |
| 7,098,800 B2 | 8/2006 | Gass |
| 7,100,483 B2 | 9/2006 | Gass et al. |
| 7,121,358 B2 | 10/2006 | Gass et al. |
| 7,137,326 B2 | 11/2006 | Gass et al. |
| 7,171,879 B2 | 2/2007 | Gass et al. |
| 7,197,969 B2 | 4/2007 | Gass et al. |
| 7,210,383 B2 | 5/2007 | Gass et al |
| 7,225,712 B2 | 6/2007 | Gass et al. |
| 7,228,772 B2 | 6/2007 | Gass |
| 7,231,856 B2 | 6/2007 | Gass et al. |
| 7,284,467 B2 | 10/2007 | Gass et al. |
| 7,290,472 B2 | 11/2007 | Gass et al. |
| 7,290,967 B2 | 11/2007 | Steimel et al. |
| 7,308,843 B2 | 12/2007 | Gass et al. |
| 7,328,752 B2 | 2/2008 | Gass et al. |
| 7,347,131 B2 | 3/2008 | Gass |
| 7,350,444 B2 | 4/2008 | Gass et al. |
| 7,350,445 B2 | 4/2008 | Gass et al. |
| 7,353,737 B2 | 4/2008 | Gass et al. |
| 7,357,056 B2 | 4/2008 | Gass et al. |
| 7,359,174 B2 | 4/2008 | Gass |
| 7,377,199 B2 | 5/2008 | Gass et al. |
| 7,421,315 B2 | 9/2008 | Gass et al. |
| 7,472,634 B2 | 1/2009 | Gass et al. |
| 7,475,542 B2 | 1/2009 | Borg et al. |
| 7,481,140 B2 | 1/2009 | Gass et al. |
| 7,509,899 B2 | 3/2009 | Gass et al. |
| 7,525,055 B2 | 4/2009 | Gass et al. |
| 7,536,238 B2 | 5/2009 | Gass |
| 7,540,334 B2 | 6/2009 | Gass et al. |
| 7,591,210 B2 | 9/2009 | Gass et al. |
| 7,600,455 B2 | 10/2009 | Gass et al. |
| 7,628,101 B1 * | 12/2009 | Knapp et al. .................. 83/62.1 |
| 2003/0089212 A1 * | 5/2003 | Parks et al. .................. 83/473 |
| 2004/0159198 A1 | 8/2004 | Peot et al. |

FOREIGN PATENT DOCUMENTS

DE 202004012468 11/2004

* cited by examiner

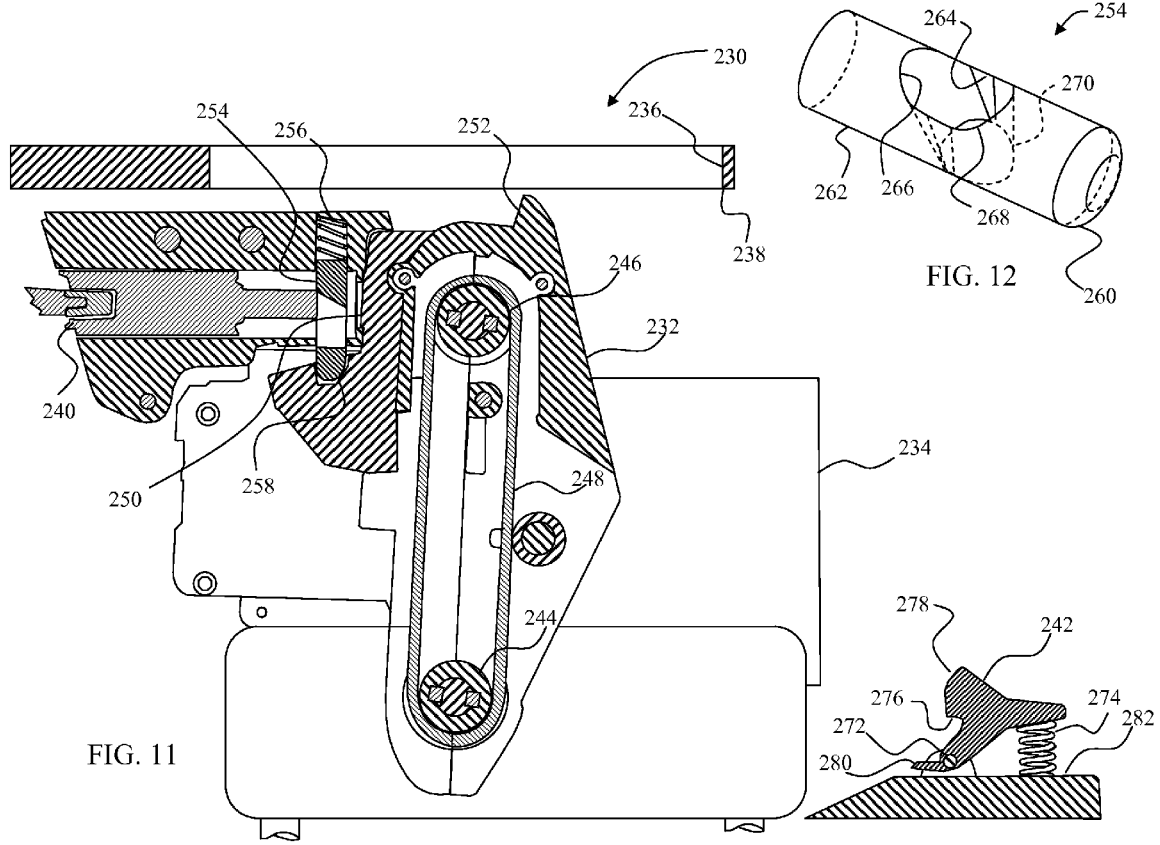

TABLE SAW WITH SWING ARM SUPPORT

Cross-reference is made to U.S. Utility patent application Ser. No. 12/547,818 entitled "Table Saw with Actuator Module" by Mehta et al., which was filed on Aug. 26, 2009; U.S. Utility patent application Ser. No. 12/547,859 entitled "Table Saw with Dust Shield" by Chung, which was filed on Aug. 26, 2009; U.S. Utility patent application Ser. No. 12/547,912 entitled "Table Saw with Positive Locking Mechanism" by Chung et al., which was filed on Aug. 26, 2009; U.S. Utility patent application Ser. No. 12/547,977 entitled "Table Saw with Belt Stop" by Chung, which was filed on Aug. 26, 2009; U.S. Utility patent application Ser. No. 12/548,035 entitled "Table Saw with Alignment Plate" by Chung et al., which was filed on Aug. 26, 2009; U.S. Utility patent application Ser. No. 12/548,201 entitled "Table Saw with Mechanical Fuse" by Oberheim, which was filed on Aug. 26, 2009; U.S. Utility patent application Ser. No. 12/548,236 entitled "Table Saw with Pressure Operated Actuator" by Fischer et al., which was filed on Aug. 26, 2009; U.S. Utility patent application Ser. No. 12/548,263 entitled "Table Saw with Reset Mechanism" by Groth et al., which was filed on Aug. 26, 2009; U.S. Utility patent application Ser. No. 12/548,280 entitled "Table Saw with Linkage Drop System" by Holmes et al., which was filed on Aug. 26, 2009; U.S. Utility patent application Ser. No. 12/548,317 entitled "Table Saw with Ratchet Mechanism" by Chung et al., which was filed on Aug. 26, 2009; and U.S. Utility patent application Ser. No. 12/548,342 entitled "Table Saw with Actuator Reset Mechanism" by Chung, which was filed on Aug. 26, 2009, the entirety of each of which is incorporated herein by reference. The principles of the present invention may be combined with features disclosed in those patent applications.

FIELD

The present disclosure relates to power tools and more particularly to power tools with exposed shaping devices.

BACKGROUND

A number of power tools have been produced to facilitate forming a work piece into a desired shape. One such power tool is a table saw. A wide range of table saws are available for a variety of uses. Some table saws such a cabinet table saws are very heavy and relatively immobile. Other table saws, sometimes referred to as jobsite table saws, are relatively light. Jobsite table saws are thus portable so that a worker can position the table saw at a job site. Some accuracy is typically sacrificed in making a table saw sufficiently light to be mobile. The convenience of locating a table saw at a job site, however, makes job site table saws very desirable in applications such as general construction projects.

All table saws, including cabinet table saws and job site table saws, present a safety concern because the saw blade of the table saw is typically very sharp and moving at a high rate of speed. Accordingly, severe injury such as severed digits and deep lacerations can occur almost instantaneously. A number of different safety systems have been developed for table saws in response to the dangers inherent in an exposed blade moving at high speed. One such safety system is a blade guard. Blade guards movably enclose the saw blade, thereby providing a physical barrier that must be moved before the rotating blade is exposed. While blade guards are effective to prevent some injuries, the blade guards can be removed by a user either for convenience of using the table saw or because the blade guard is not compatible for use with a particular shaping device. By way of example, a blade guard is typically not compatible with a dado blade and must typically be removed when performing non-through cuts.

Table saw safety systems have also been developed which are intended to stop the blade when a user's hand approaches or touches the blade. Various stopping devices have been developed including braking devices which are physically inserted into the teeth of the blade. Such approaches are extremely effective. Upon actuation of this type of braking device, however, the blade is typically ruined because of the braking member. Additionally, the braking member is typically destroyed. Accordingly, each time the safety device is actuated; significant resources must be expended to replace the blade and the braking member. Another shortcoming of this type of safety device is that the shaping device must be toothed. Moreover, if a spare blade and braking member are not on hand, a user must travel to a store to obtain replacements. Thus, while effective, this type of safety system can be expensive and inconvenient.

Some safety systems incorporating blade braking systems also move the blade below the surface of the table saw once the blade has been stopped. In this type of system, a latch is typically used to maintain the blade in position above the table saw surface until the braking system is activated. Delays in releasing the latch and moving the blade increase the potential for serious injury. One approach to increasing the speed with which a blade is moved out of a potentially dangerous position is to rapidly accelerate the blade by application of a large force. Unless the force is precisely applied, however, significant torque in undesired planes may occur.

In view of the foregoing, it would be advantageous to provide a power tool with a safety system that does not interfere with shaping procedures. A safety system that did not damage the blade or other shaping device when the safety system is activated would be further advantageous. A further advantage would be realized by a safety system that reduced undesired movement of the blade or shaping device by the safety system.

SUMMARY

In accordance with one embodiment a table saw includes a latch hold mechanism, a swing arm pivotable about a pivot along a swing arm path between a first swing arm position and a second swing arm position, a latch movable between a first latch position whereat the swing arm is maintained at the first swing arm position and a second latch position whereat the swing arm is not maintained at the first swing arm position, an actuating device configured to transfer a force to the swing arm when the swing arm is maintained at the first swing arm position resulting in a bias on the latch in a direction toward the second latch position, at least one swing arm guide extending adjacent to the swing arm path, at least one swing arm support positioned to be in opposition to the at least one swing arm guide along the swing arm path, and a control system configured to control the actuating device to transfer a force to the swing arm when the swing arm is maintained at the first swing arm position sufficient to move the latch from the first latch position to the second latch position.

In another embodiment, a power tool includes a work piece support surface, a shaping device support shaft automatically retractable along a retraction path from a first shaft position to a second shaft position in response to a sensed condition, wherein the second shaft position is more distal to the work piece support surface than the first shaft position, a latch pin movable between a first latch pin position whereat the shaping device support shaft is maintained at the first shaft position and a second latch pin position whereat the shaping device support shaft is not maintained at the first shaft position, at least one swing arm guide extending adjacent to the retraction path, at least one swing arm support positioned to be in opposition to the at least one swing arm guide along the retraction path, and a control system configured to cause the actuator to generate a force causing the latch pin to move from the first latch pin position toward the second latch pin position in response to a sensed condition.

BRIEF DESCRIPTION OF THE DRAWINGS

The accompanying drawings illustrate various embodiments of the present disclosure and together with a description serve to explain the principles of the disclosure.

FIG. 11 depicts a partial perspective cross-sectional view of a power tool with a vertical swing arm and a positive locking mechanism;

FIG. 12 depicts a perspective view of the positive locking mechanism of FIG. 11;

DETAIL DESCRIPTION OF THE DISCLOSURE

Figure 1:
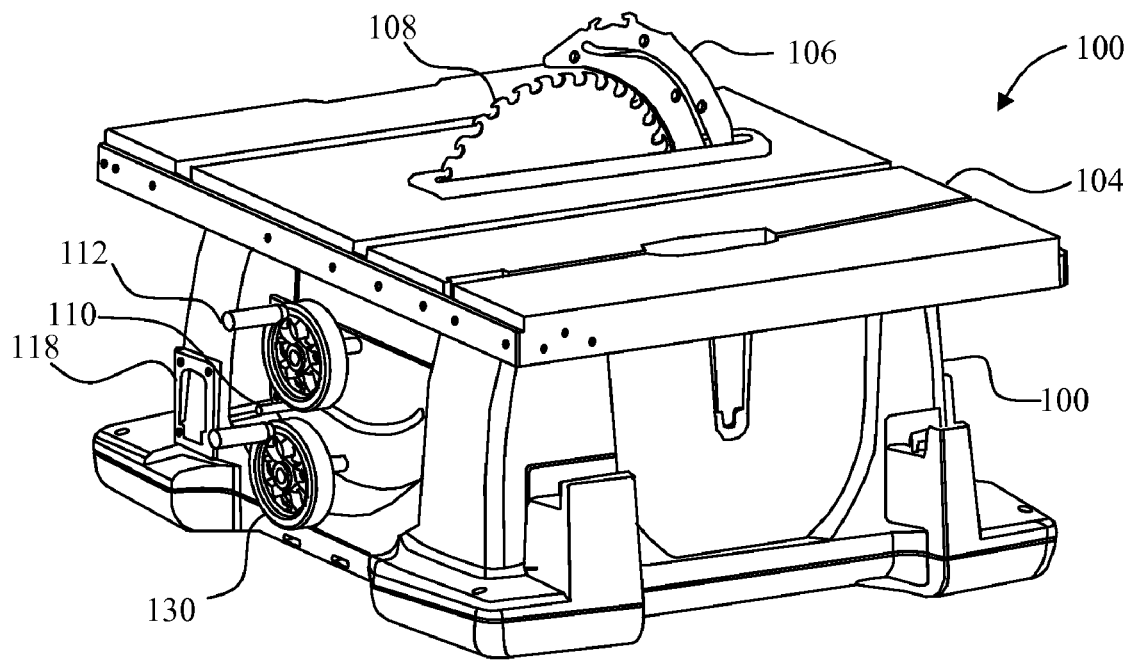
FIG. 1 depicts a top perspective view of a table saw incorporating a mitigation system in accordance with principles of the invention.

While the power tools described herein are susceptible to various modifications and alternative forms, specific embodiments thereof have been shown by way of example in the drawings and will herein be described in detail. It should be understood, however, that there is no intent to limit the power tools to the particular forms disclosed. On the contrary, the intention is to cover all combinations of features, modifications, equivalents, and alternatives falling within the spirit and scope of the invention as defined by the appended claims.

Referring to FIG. 1, a table saw 100 is shown. The table saw 100 includes a base housing 102 and a work-piece support surface 104. A splitter 106 is positioned adjacent to a blade 108 which extends from within the base housing 102 to above the work-piece support surface 104. A blade guard (not shown) may be attached to the splitter 106. An angle indicator 110 indicates the angle of the blade 108 with respect to the work-piece support surface 104. A bevel adjust turn-wheel 112 may be used to establish the angle of the blade 108 with respect to the work-piece support surface 104 by pivoting a frame 114 (shown in FIG. 2) within the base housing 102.

A motor 116 which is powered through a switch 118 located on the base housing 102, is supported by a carriage assembly 120. The carriage assembly 120 and a stop pad 122 are supported by the frame 114. The carriage assembly 120 includes a carriage 124 to which the motor 116 is mounted and two guiderails 126/128. The position of the carriage 124 along the guiderails 126/128 is controlled by a blade height turn-wheel 130 through a gearing assembly 132 and a height adjustment rod 134. The carriage 124 fixedly supports a latch assembly 140 and pivotably supports a swing arm assembly 142.

Figure 3:
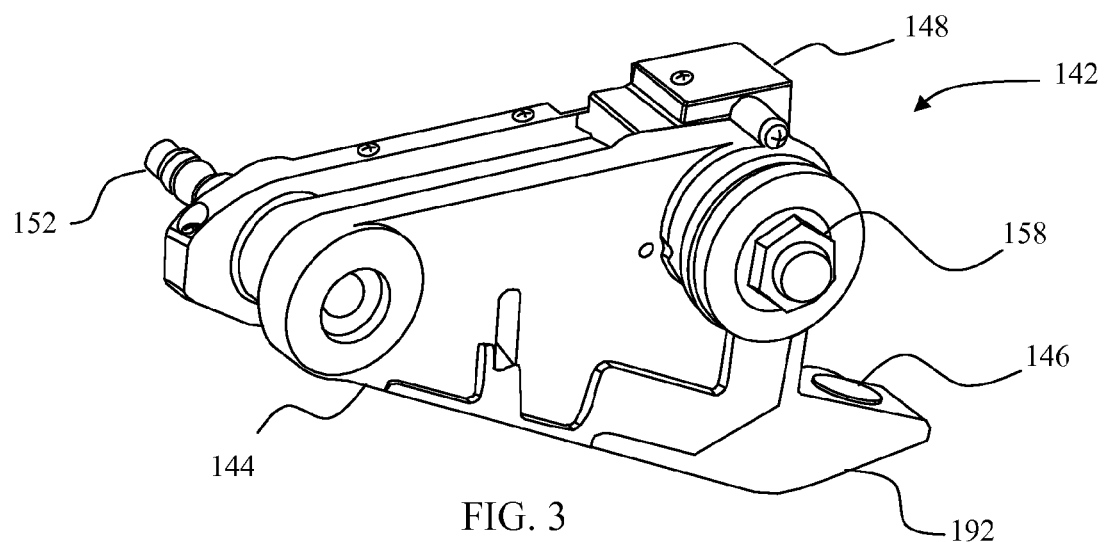
FIG. 3 depicts a perspective view of the swing arm assembly of the table saw of FIG. 1.
Figure 7:
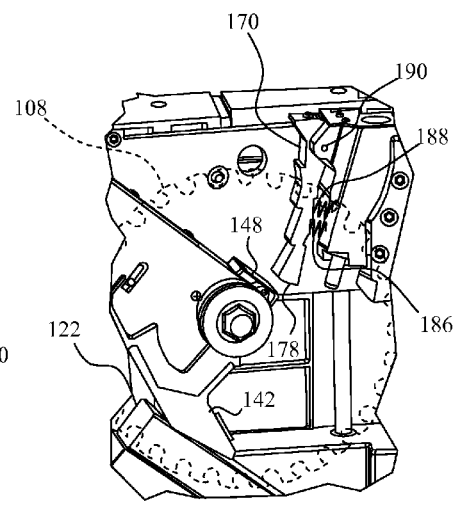
FIG. 7 depicts a partial perspective view of the swing arm assembly and latch assembly of FIG. 1 after the swing arm assembly has cleared the latch hold allowing the latch hold to be biased into the swing path.

The swing arm assembly 142 is pivotally coupled to the carriage 124 for movement between a latched position (see FIG. 4A) and a de-latched position (see FIG. 7). The swing arm assembly 142 includes a housing 144, which encloses a power wheel 150 that is driven by a power shaft 152. The power shaft 152 may be directly driven by the motor 116 or by a reduction gear. A belt 154 transfers rotational movement from the power wheel 150 to a blade wheel 156. A nut 158 is used to affix the blade 108 (not shown in FIGS. 3 and 4 for purpose of clarity) to the blade wheel 156. A tensioner 160 maintains the belt 154 at a desired tension. Additionally, as shown in FIG. 3, a strike plate 146 and a rebound plate 148 are mounted on the housing 144.

Figure 4A:
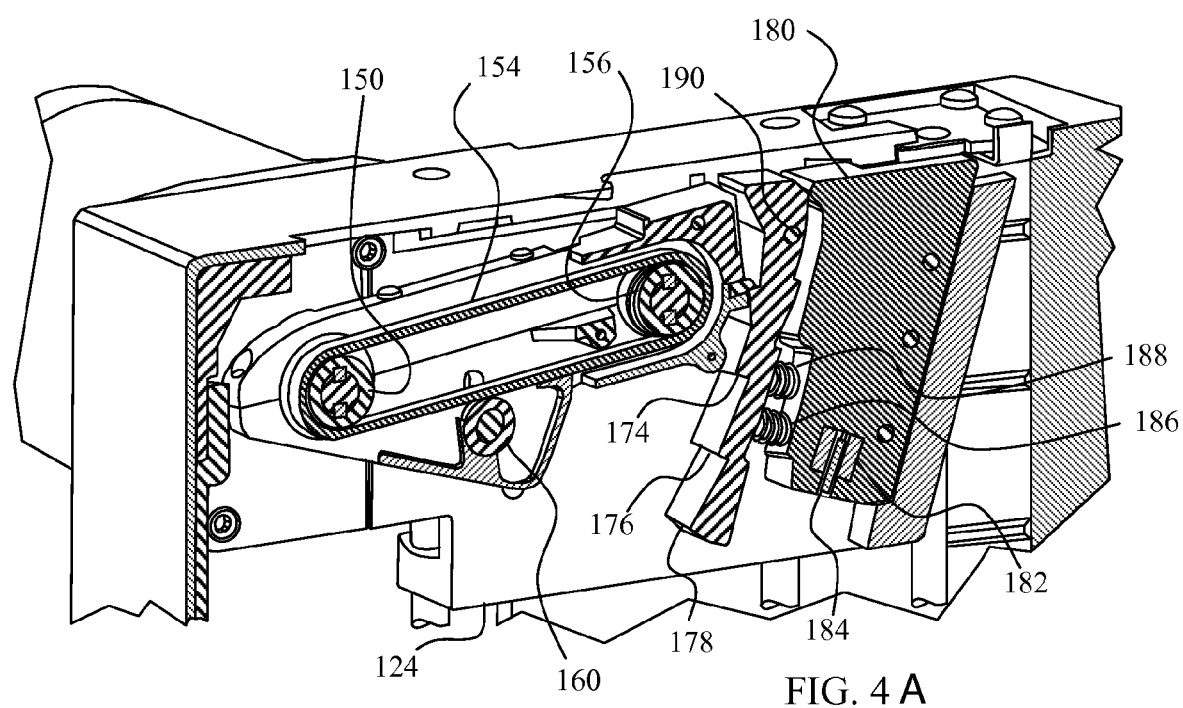
FIG. 4A depicts a partial perspective cross-sectional view of the swing arm assembly of FIG. 3 supported by a latch assembly including a latch hold that is biased against the swing arm assembly.
Figure 4B:
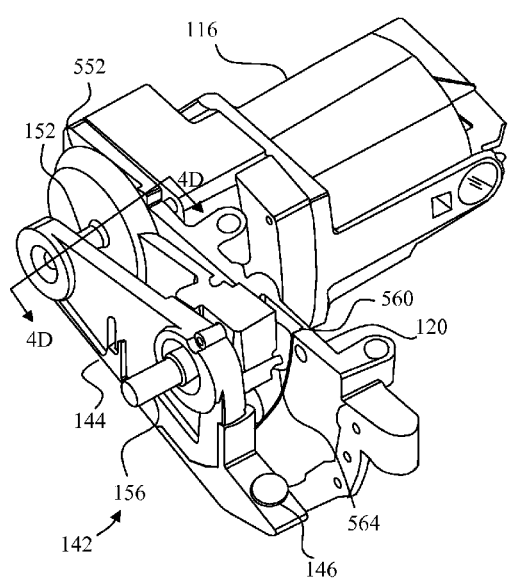
FIG. 4B depicts a perspective view of a swing arm assembly including a support flange.
Figure 4C:
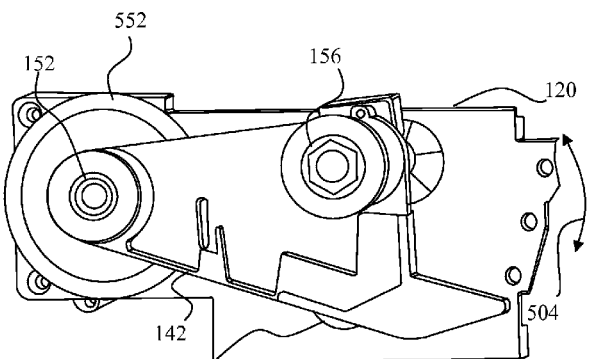
FIG. 4C depicts a side view of the swing arm assembly of FIG. 4B.
Figure 4E:
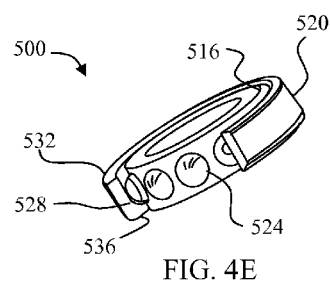
FIG. 4E depicts a partial laid open view of a bearing for use with the swing arm assembly of FIG. 4B.
Figure 4D:
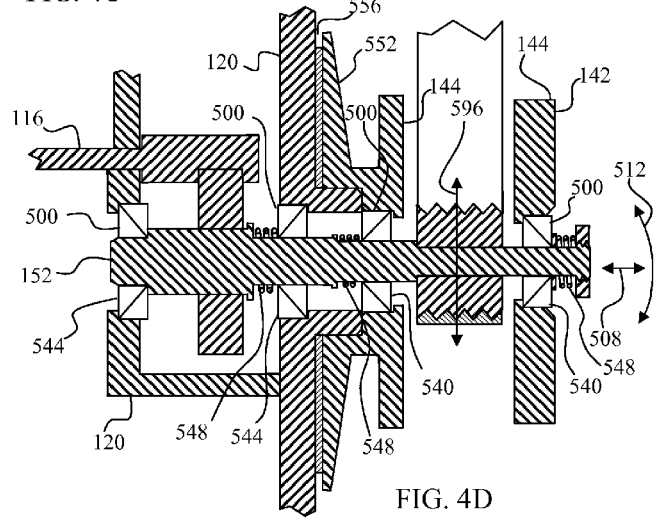
FIG. 4D depicts a partial cross-section view of the swing arm assembly taken along line 4D-4D of FIG. 4B.

As shown in FIG. 4D, bearings 500 are coupled to the power shaft 152. The bearings 500 are provided as angular contact ball bearings, radial ball bearings, or tapered roller thrust bearings. The bearings 500 provide support for the power shaft in a radial direction 504 (see FIG. 4C), axial direction 508 (see FIG. 4D), and cross axial direction 512 (see FIG. 4D). As shown in FIG. 4E, each bearing 500 includes an inner race 516, an outer race 520, and a plurality of balls 524. The inner race 516 is fixed to the power shaft 152 for rotation with the power shaft 152. The outer race 520 is fixed to one of the support arm assembly 142, the carriage 124, and the frame 104. The inner race 516 is configured to rotate relative the outer race 520. The outer race 520 includes an axially asymmetric surface 528 configured to support a cross axial load imparted upon the power shaft 152 without compromising support of the power shaft 152. The balls 524 are configured to support the inner race 516 by contacting the asymmetric surface 528. The bearings 500 support an axial or cross-axial load directed from a face 532 of the bearing 500 to a back side 536 of the bearing 500. In particular, a cross axial load directed from the face 532 to the back side 536 at an angle between 0 to 15 degrees of the rotational axis of the power shaft may be supported without damage to the bearing 500, the power shaft 152, or the swing arm assembly 142.

Bearings 540 support the power shaft 152 proximate the swing arm assembly 142. The bearings 540 are positioned in a back to back orientation to provide bi-directional thrust support. Similarly, bearings 544 support the power shaft 152 proximate the output shaft of the motor 116. The bearings 544 are positioned in a face to face orientation, which also provides bi-directional thrust support. Springs 548 impart a pre-load force upon the bearings 500 that ensures the inner race 516 is seated within the outer race 520 even when a radial, an axial, or a cross axial load is not imparted upon the bearings 500.

To support further the power shaft 152 and the swing arm assembly 142, the table saw 100 includes a pivot support flange 552. As shown in FIG. 4D, the pivot support flange 552 is coupled to the swing arm assembly 142 proximate the power shaft 152. The flange 552 extends radially from the power shaft 152. As illustrated, the flange 552 extends completely about the power shaft 152; however, in other embodiments the flange 552 may extend only partially around the power shaft 152. When the swing arm assembly 142 pivots to the de-latched position the flange 552 rotates relative the carriage 124. The flange 552 is configured to resist torsional force imparted upon the swing arm assembly 142 in direction 512 of FIG. 4D.

A friction reducing plate 556 is coupled to the power shaft 152 between the carriage 124 and the flange 552. The plate 556 has a diameter approximately equal to the diameter of the flange 552. The thickness of the plate 556 fills a gap between the carriage 120 and the flange 552. The plate 556 may be formed of materials including, but not limited to, metal, nylon, polyoxymethylene, and polytetrafluoroethylene. In some embodiments, the plate 552 may be impregnated with grease.

Figure 4F:
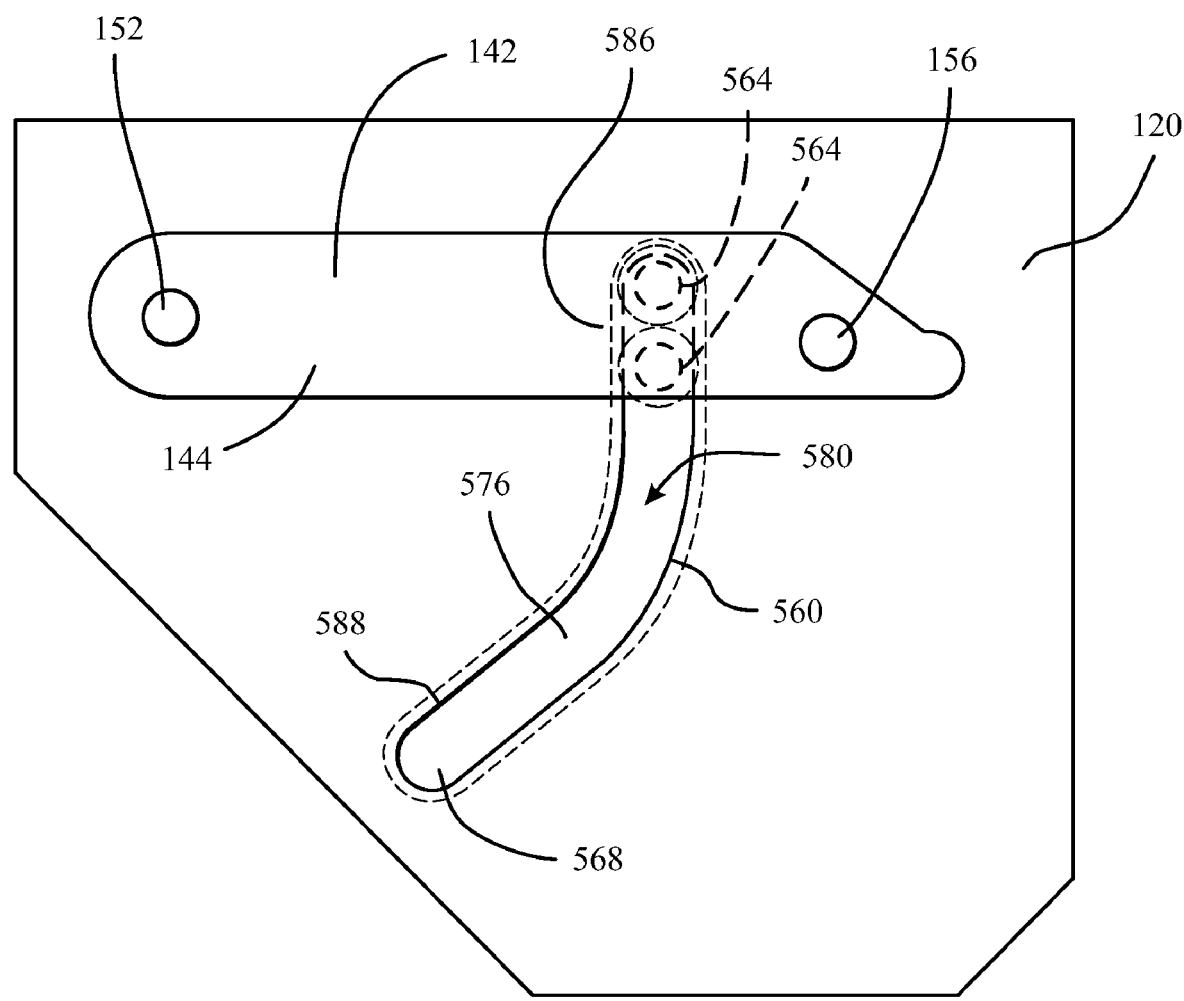
FIG. 4F depicts a side view of a swing arm assembly and a carriage including a swing guide path.
Figure 4G:
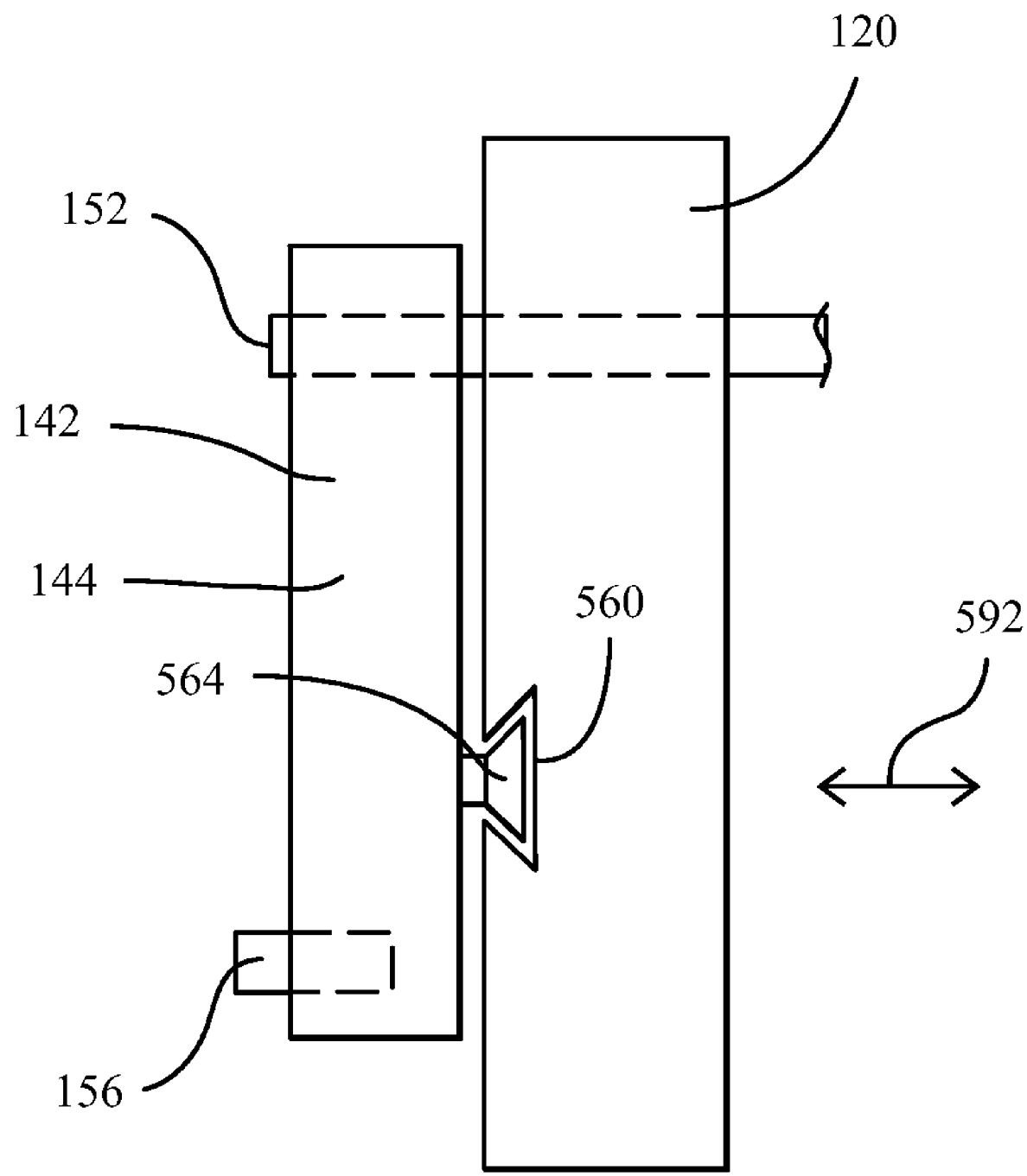
FIG. 4G depicts a top view of the swing arm assembly and carriage of FIG. 4F.
Figure 4H:
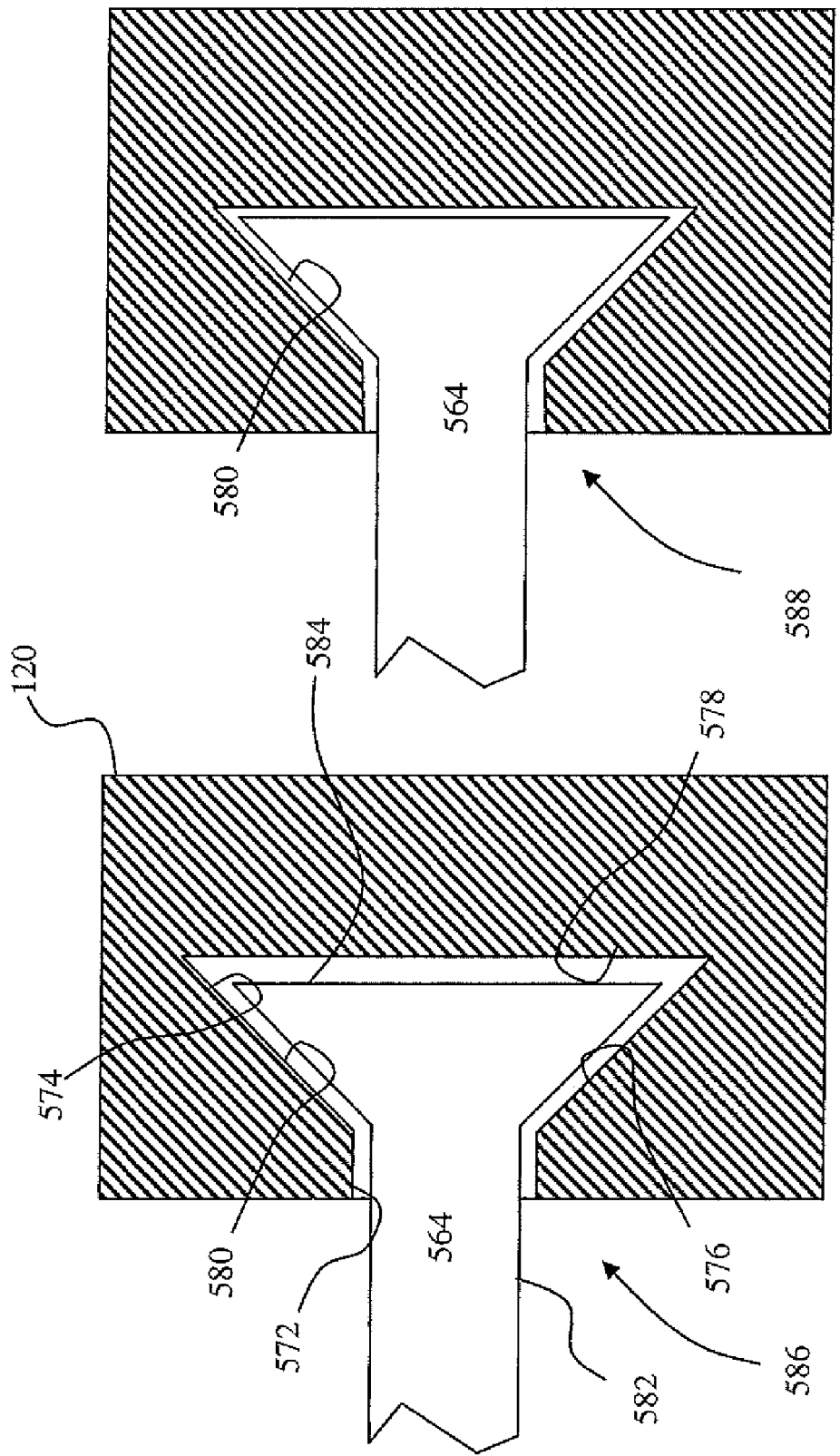
FIG. 4H depicts an upper and a lower cross-sectional view of a carriage with a guide with a decreasing channel at the lower portion of the guide.

As shown in FIGS. 4F-4H, the swing arm assembly 142 includes a swing path guide 560 and two trackers 564. The swing path guide 560 is formed in a portion of the carriage 120 adjacent the pivotal path of the swing arm assembly 142. The length and trajectory of the swing path guide 560 are determined by the pivotal path of the swing arm assembly 142, as the swing arm assembly 142 pivots to the de-latched position. As shown in FIG. 4H, the swing path guide 560 tapers toward an end 568 of the guide 560. In particular, the swing path guide 560 includes a slot 572 that divides an outer wall into two outer wall portions 574 and 576. The swing path guide 560 further includes a rear wall 578. The outer wall portions 574 and 576 and the rear wall 578 define a channel 580 that is wider than the slot 572.

The trackers 564 include a spacer bar 582 and a shaped head portion 584. The 582 extends from the swing arm assembly 142 toward the swing path guide 560. The head 584 is connected to the bar 582 and is configured to fit within the recess 580. The head 584 has a shape complementary to a shape of the recess 580 to prevent the head 584 from moving excessively along the axis 592 of FIG. 4G. Accordingly, the trackers 564 prevent the swing arm assembly 142 from twisting in direction 512 of FIG. 4D. Additionally, as shown in FIG. 4H, the channel 580 is larger at an upper portion 586 of the channel 580 than at a lower portion 588 of the channel 580.

Figure 5:
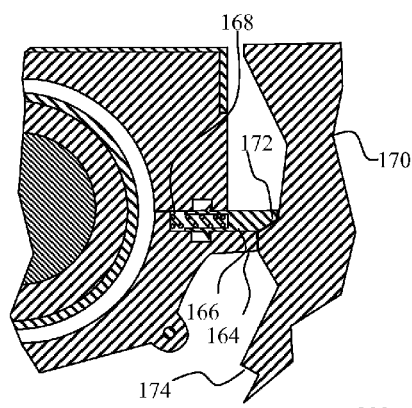
FIG. 5 depicts a partial cross-section view of a swing arm assembly held in position by a latch pin biased against a latch hold.

With reference to FIG. 5, the swing arm assembly 142 includes a lip 164 and a latch pin 166 which is biased by a spring 168 toward a latch hold 170 which is part of the latch assembly 140. In one embodiment, the latch pin is fixedly attached to the swing arm assembly 142. The latch hold 170 includes a latch ledge 172 and three rebound ledges 174, 176, and 178 (see FIG. 4A). As shown in FIG. 4A, the latch ledge is formed complementarily to the shape of the latch pin 166. The latch assembly 140 further includes a base 180 and a solenoid 182 with a solenoid pin 184. Two springs 186 and 188 are positioned between the base 180 and the latch hold 170 which is mounted by a pivot 190 to the carriage 124.

The table saw 100, includes an actuator 600 for pivoting the swing arm assembly 142 to the de-latched position. As described above, the actuator 600 may be a solenoid 182 coupled to the carriage 120. Upon being coupled to a source of electrical energy (not illustrated), the pin 184 is configured to be forcibly extended from the solenoid 182 along a pin axis 604 (see FIG. 4A). The pin 184 may be extended from the solenoid 182 without damaging the solenoid 182.

Figure 4I:
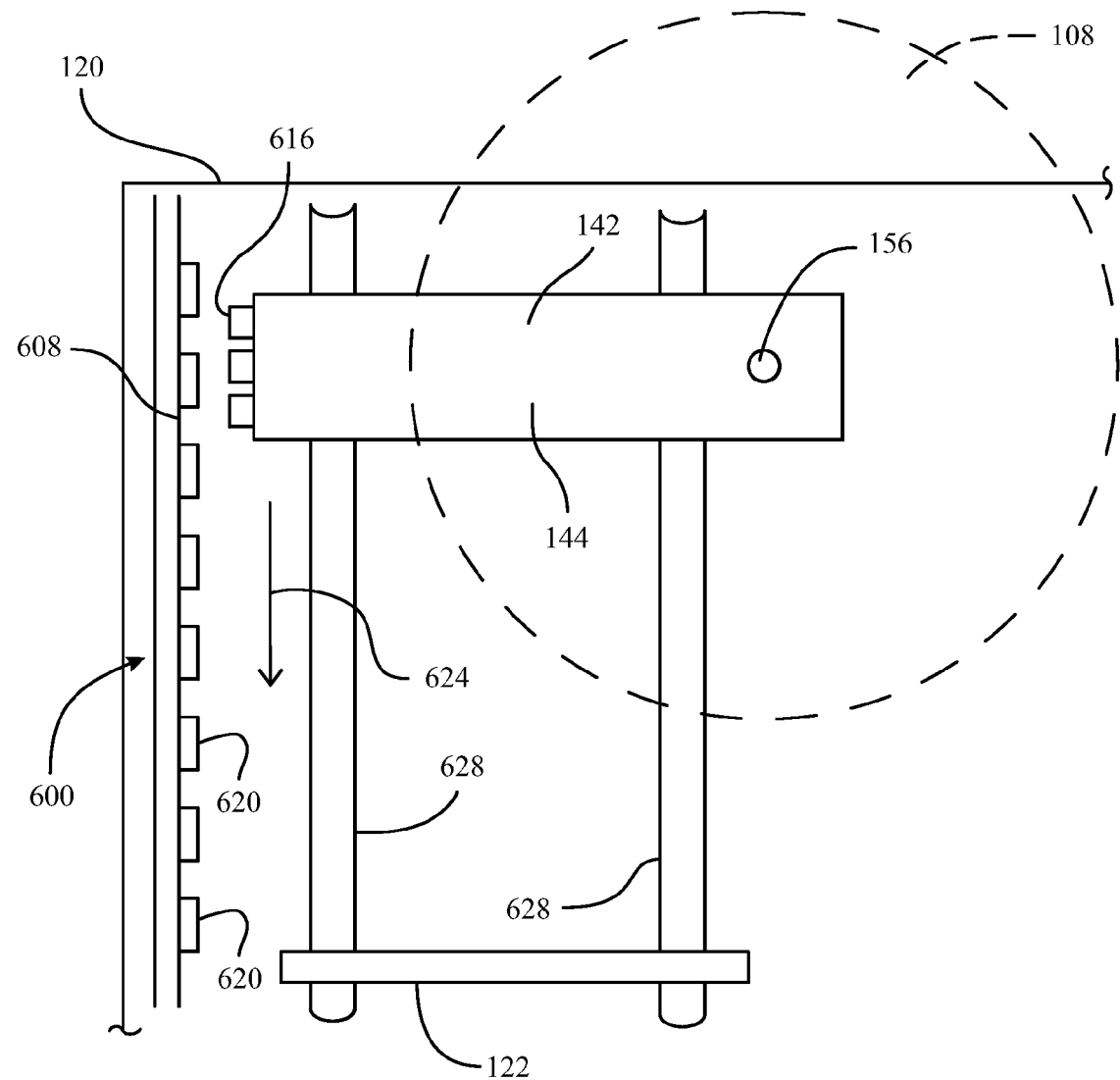
FIG. 4I depicts a side view of a swing arm assembly including a linear electromagnetic actuator.
Figure 4J:
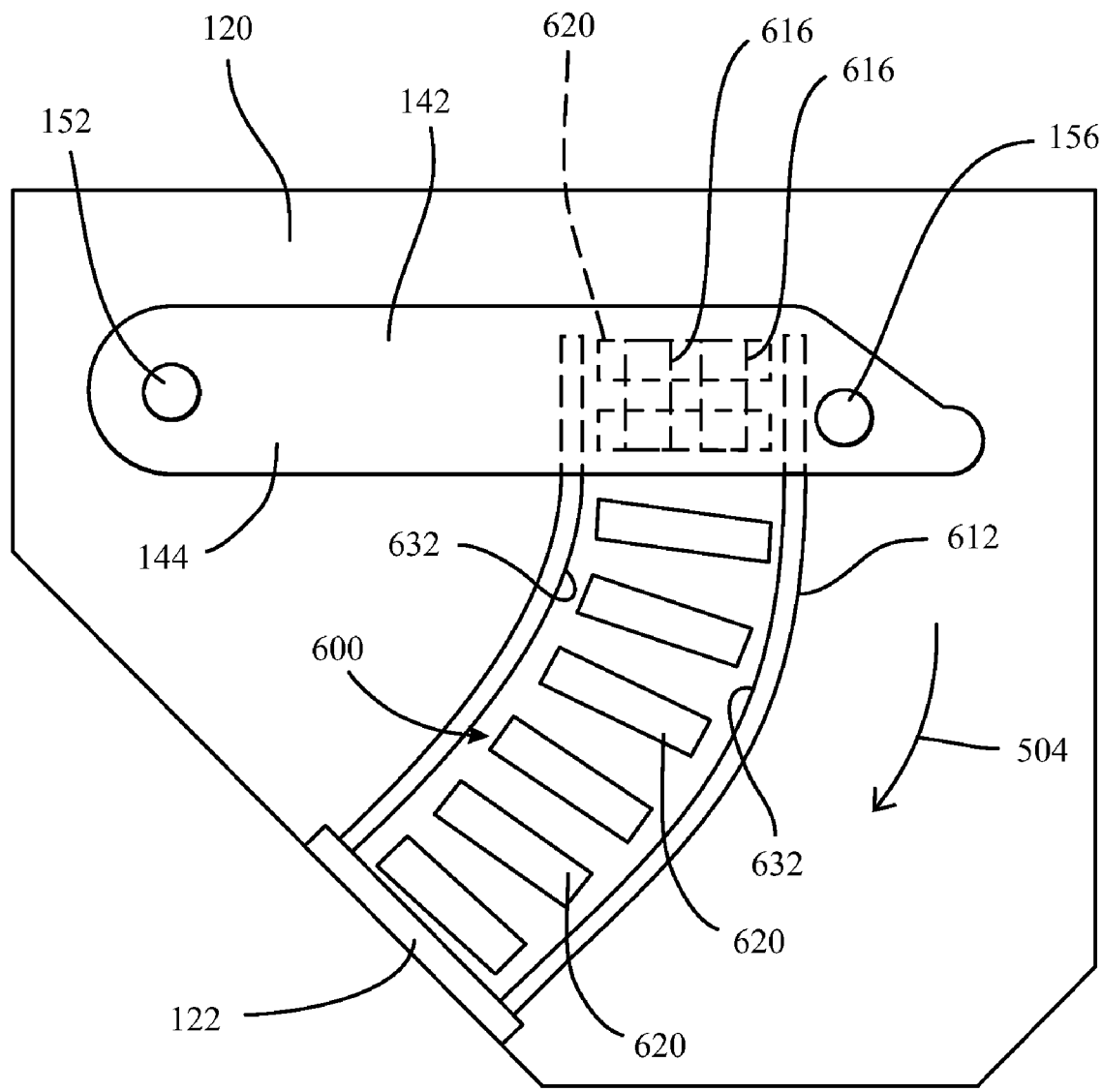
FIG. 4J depicts a side view of a swing arm assembly including a curved track electromagnetic actuator.
Figure 4K:
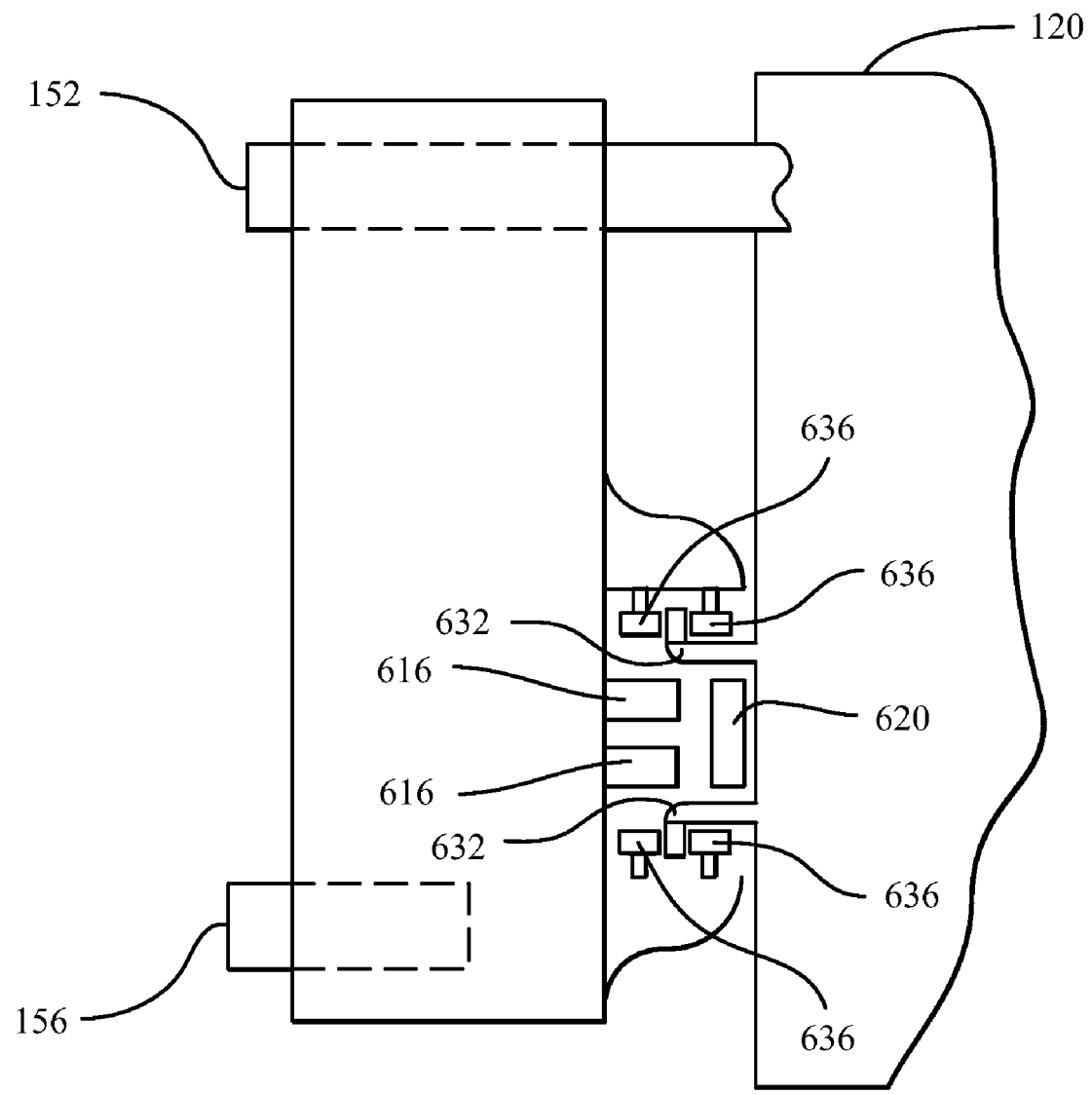
FIG. 4K depicts a top view of the swing arm assembly and the curved track electromagnetic actuator of FIG. 4J.

Additionally or alternatively, as shown in FIGS. 4I-4K, the electromagnetic actuator 600 may be an electromagnetic track. A linear track 608 is depicted in FIG. 4I and a curved track 612 is depicted in FIGS. 4J and 4K. In both embodiments, magnets 616 are fixedly coupled to the swing arm assembly 142 proximate the track 608, 612. The tracks 608, 612 include coils of wire 620 selectively coupled to a source of electrical energy (not illustrated). Upon coupling the coils 620 to the electrical energy an electromagnetic field is developed, which repels the magnets 616 coupled to the swing arm assembly 142. Specifically, in FIG. 4I the field repels the magnets 616 in direction 624, thereby causing the swing arm 142 to slide down the guide posts 628. Similarly, in FIG. 4J the field repels the magnets 616 in direction 504, thereby causing the swing arm 142 to pivot about the power shaft 152 to the de-latched position.

The curved track 612 of FIGS. 4J and 4K includes a pair of rails 632, which define the track 612. The swing arm assembly 142 is configured to engage the rails 632 as it pivots to the de-latched position. In particular, the swing arm assembly 142 includes guide wheels 636 for engaging the track 612. As the swing arm assembly 142 pivots toward the de-latched position the guide wheels 636 engage the rails 632 to maintain the swing arm assembly 142 a fixed distance from the coils 620 and to prevent the swing arm assembly 142 from twisting in direction 512 of FIG. 4D.

Figure 4L:
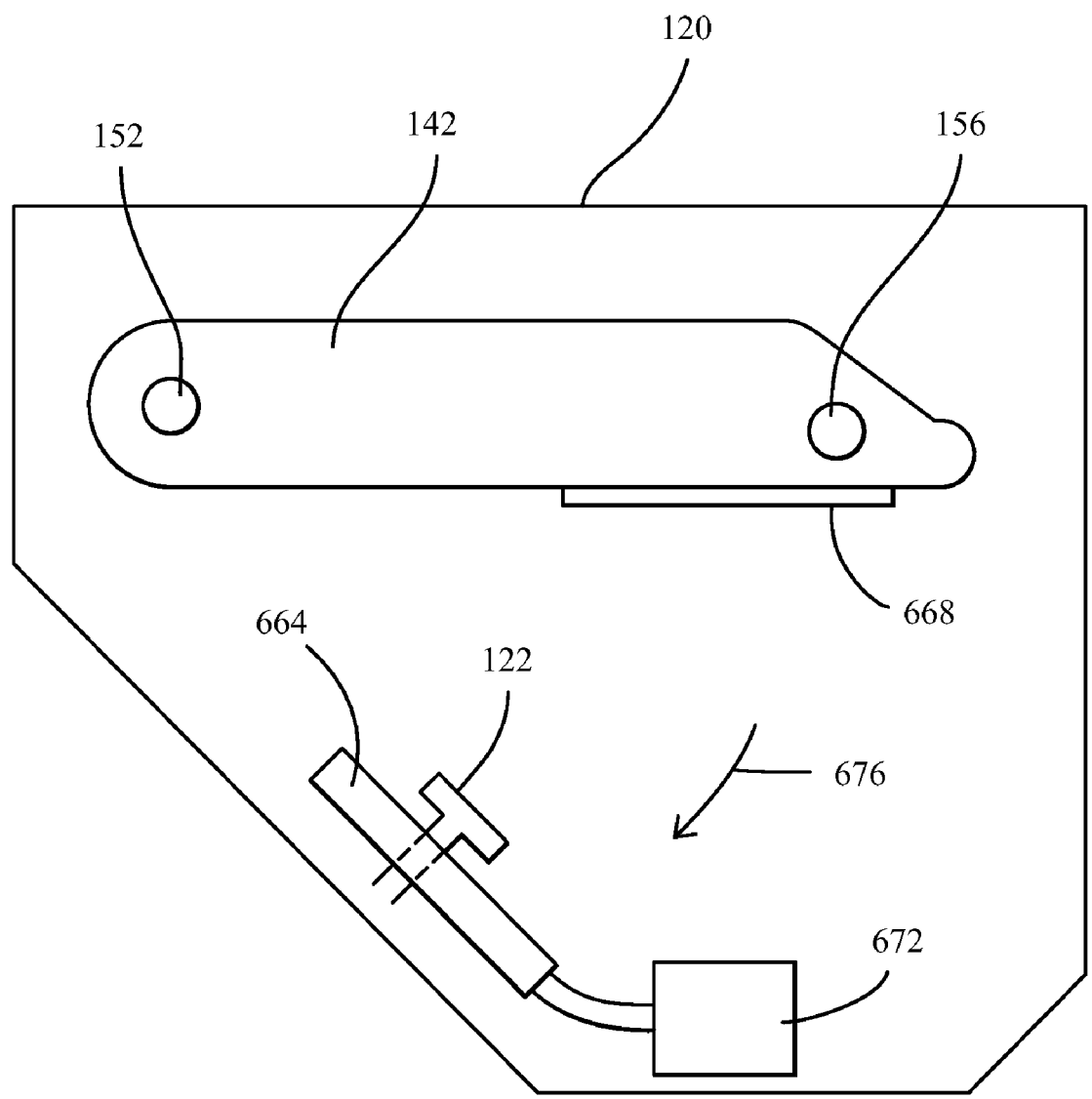
FIG. 4L depicts a side view of a swing arm assembly including an electromagnetic brake.

Referring to FIG. 4L, the table saw may include an electromagnetic brake 660 to reduce the kinetic energy of the swing arm assembly 142 as the swing arm assembly 142 reaches the de-latched position. The electromagnetic brake 660 includes an electromagnet 664 and a magnetic plate 668. When the electromagnet 664 is coupled to a source of electrical energy 672 it is configured generate a magnetic field, which repels the plate 668. The plate 668 is fixedly connected to the swing arm assembly 142. Therefore, the magnetic field tends to slow the rotation of the swing arm assembly 142 in direction 676 of FIG. 4L.

Operation of the table saw 100 is described with reference to FIGS. 1-5. Initially, the swing arm assembly 142 is maintained in a latched position with the latch pin 166 resting on the latch ledge 170 as shown in FIG. 5. In this position, the springs 188 and 186 are under compression and exert a bias on the latch hold 170 about the pivot 190 in a clockwise direction as viewed in FIG. 4A. The latch hold 170 is thus biased into contact with the lip 164 of the swing arm assembly 142 which restricts rotation of the latch hold 170.

Additionally, the blade wheel 156 is positioned sufficiently close to the work-piece support surface 104 that the blade 108 extends above the work-piece support surface 104 as shown in FIG. 1. A user operates the bevel adjust turn wheel 112 to pivot the frame 114 with respect to the work-piece support surface 104 to establish a desired angle between the blade 108 and the work-piece support surface 104. The user further operates the blade height adjustment turn-wheel 130 to move the carriage 124 along the guiderails 126/128 to establish a desired height of the blade 108 above the work-piece support surface 104.

Using the switch 118, power is then applied to the motor 116 causing the output shaft 152 and the power wheel 150 to rotate. Rotation of the power wheel 150 causes the belt 154 to rotate the blade wheel 156 and the blade 108 which is mounted on the blade wheel 156. A work-piece may then be shaped by moving the work-piece into contact with the blade 108.

The table saw 100 includes a sensing and control circuit (not shown) which activates the solenoid 182 in response to a sensed condition. Any desired sensing and control circuit may be used for this purpose. One acceptable sensing and control circuit is described in U.S. Pat. No. 6,922,153, the entire contents of which are herein incorporated by reference. The safety detection and protection system described in the '153 patent senses an unsafe condition and provides a control signal which, in the table saw 100, is used to actuate the solenoid 182.

Upon actuation of the solenoid 182, the solenoid pin 184 is forced outwardly from the solenoid 182. When the swing arm assembly 142 is maintained in a latched position with the latch pin 166 resting on the latch ledge 170 as shown in FIG. 5, the strike plate 146 is aligned with the solenoid 182. Accordingly, as the solenoid pin 184 is forced out of the solenoid 182, the solenoid pin 184 impacts the strike plate 146.

The shape of the latch pin 166 and the latch ledge 172 is selected such that the impact of the solenoid pin 184 on the strike plate 146 generates a force tending to push the latch pin 166 against the spring 168. The spring constant of the spring 168 and the operating characteristics of the solenoid 182 are selected such that when the solenoid pin 184 impacts the strike plate 146 the generated force is sufficient to compress the spring 168 and to force the latch pin 166 into a position whereat the swing arm assembly 142 is no longer maintained in position adjacent to the latch assembly 140 by the latch pin 166. In embodiments with a rigid latch pin 166, the generated force causes the latch hold 170 to rotate about the pivot 190 in a counterclockwise direction thereby forcing the springs 186 and 188 into further compression. When the latch hold 170 has rotated sufficiently, the latch ledge moves out from underneath the latch pin 166.

In either event, the swing arm assembly 142 is no longer supported by the latch hold 170. Consequently, the swing arm assembly 142 pivots about the power shaft 152 in the direction of the arrow 200 of FIG. 6 such that the blade wheel 156 moves away from the work-piece support surface 104 through the position shown in FIG. 6 to the position shown in FIG. 7. Accordingly, the blade 108 is pulled by the swing arm assembly 142 in a direction away from the work-piece support surface 104.

Because the latch ledge 172 is formed complementarily to the shape of the latch pin 166, the wear of the latch ledge 172 and the latch pin 166 during the de-latching described above is reduced. Accordingly, the pressure needed to effect de-latching does not change significantly over multiple actuations of the solenoid 182.

Upon contacting the strike plate 146 the solenoid pin 184 generates a torque in the swing arm assembly 142. In particular, a first torque is generated in direction 504 of FIG. 4C; however, a second torque may also be generated in direction 512 of FIG. 4D. The second torque is referred to a "twist" torque. The twist torque is a result of the strong force with which the actuator 600 contacts the swing arm assembly 142. Specifically, the twist torque may be induced in the swing arm assembly 142 in response to the pin 184 striking a point other than the mass center of the swing arm assembly 142. Additionally or alternatively, the twist torque may be generated by an unequal weight distribution along a center axis 596 (see FIG. 4D) of the swing arm assembly 142.

The bearings 500 and the flange 552 prevent the swing arm assembly 142 from bending or deforming in response to the twist torque. In particular, springs 548 preload the bearings 500 with a strong force, which prevents cross-axial movement of the power shaft 152 in direction 512 of FIG. 4D. Additionally, if the twist torque exceeds the preload force, the flange 552 prevents the swing arm assembly 142 from deforming or becoming damaged. Specifically, the large contact area of the flange 552 provides support for the swing arm assembly 142 against the carriage 120.

The friction plate 556 reduces the friction between the flange 552 and the carriage 120 as a result of the twist torque. In particular, the contact area between the flange 552 and the carriage 120 may generate a frictional force that slows the rotation of the swing arm assembly 142 to the de-latched position. This frictional force increases as the twist torque increases. Accordingly, the plate 556 reduces the friction between the flange 552 and the carriage 120 to prevent the flange 552 from slowing the rotation of the swing arm assembly 142.

Embodiments of the table saw 100 including a swing path guide 560 also prevent the swing arm assembly 142 from becoming twisted or bent in response to the twist torque. As shown in FIG. 4F, the swing arm assembly 142 includes two trackers 564 configured to fit within the recess 580 of the swing path guide 560. The movement of the trackers 564 within the recess 580 in direction 592 is limited by the distance between the inner wall 576 and the outer wall 572. Accordingly, the swing path guide 560 prevents the swing arm assembly 142 from twisting to a damaging extent in response to the twist torque. Additionally, due to the tapered shape of the recess 580, the speed of the swing arm assembly 142 is slowed as the swing arm assembly 142 approaches the end 568 of the swing path guide 560. In some embodiments, the recess 580 is not tapered.

As the swing arm assembly 142 moves in the direction of the arrow 200, the rebound plate 148 of the swing arm assembly 142 rotates below the rebound ledge 178 of the latch hold 170. At this point, rotation of the latch hold 170 about the pivot 190 is no longer restrained by the swing arm assembly 142. Accordingly, the springs 186 and 188 cause the latch hold 170 to rotate into a position whereat the rebound ledge 178 is located in the swing path of the swing arm 142, that is, the path along which the swing arm 142 moves, as shown in FIG. 7.

Figure 6:
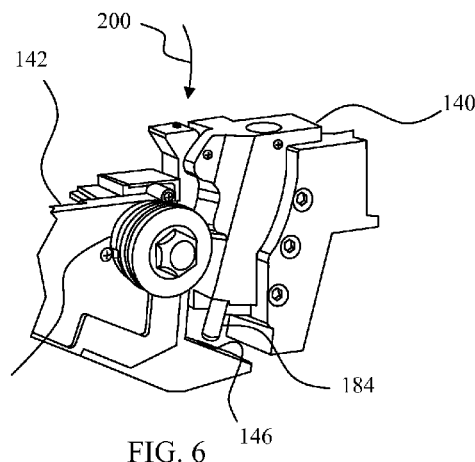
FIG. 6 depicts a partial perspective view of the swing arm assembly and latch assembly of FIG. 1 after the solenoid has been actuated thereby forcing the latch pin off of the latch hold such that the swing arm assembly moves away from the latch assembly.

The configuration of FIG. 7 further shows the swing arm assembly 142 rotated to a position whereat the swing arm assembly 142 contacts the stop pad 122. Accordingly, further rotation of the swing arm assembly 142 in the direction of the arrow 200 of FIG. 6 is impeded by the stop pad 122. At this position, the blade 108 is completely located below the work-piece support surface 104. Therefore, an operator above the work-piece support surface 104 cannot be injured by the blade 108.

In one embodiment, the stop pad 122 is made with microcellular polyurethane elastomer (MPE). MPEs form a material with numerous randomly oriented air chambers. Some of the air chambers are closed and some are linked. Additionally, the linked air chambers have varying degrees of communication between the chambers and the orientation of the linked chambers varies. Accordingly, when the MPE structure is compressed, air in the chambers is compressed. As the air is compressed, some of the air remains within various chambers, some of the air migrates between other chambers and some of the air is expelled from the structure. One such MPE is MH 24-65, commercially available from Elastogran GmbH under the trade name CELLASTO®. In other embodiments, a foam material such as "memory foam" may be used.

Use of an MPE or other appropriate material in the stop pad 122 stops rotation of the swing arm assembly 142 without damaging the swing arm assembly 142. Prior to impacting the stop pad 122, however, the swing arm assembly 142 may be moving with sufficient force to cause the swing arm assembly to rebound off of the stop pad 122. In such a circumstance, the swing arm assembly 142 will rotate about the power shaft 152 in a counterclockwise direction. Thus, the blade 108 moves toward the work-piece support surface 104. Movement of the blade 108 above the work-piece support surface 104, however, is inhibited by the latch hold 170.

Figure 8:
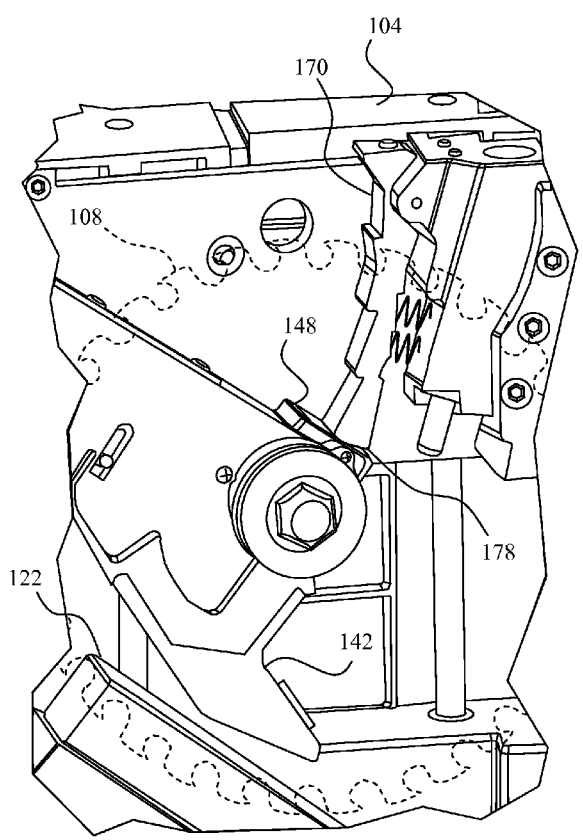
FIG. 8 depicts a partial perspective view of the swing arm assembly and latch assembly of FIG. 1 after the swing arm assembly has rebounded off of the stop pad and has been captured by a latch hold ledge thereby keeping the shaping device below the surface of the work-piece support surface.

Specifically, because the springs 186 and 188 bias the latch hold 170 to a location within the swing path of the swing arm assembly 142, movement of the swing arm assembly 142 toward the work-piece support surface 104 brings the rebound plate 148 into contact with the rebound ledge 178 as shown in FIG. 8. In the position of FIG. 8, the blade 108 remains below the surface of the work-piece support surface 104 even after the swing arm assembly 142 rebounds off of the stop pad 122. Therefore, an operator above the work-piece support surface 104 cannot be injured by the blade 108.

The spring constants for the springs 186 and 188 are thus selected to ensure that the latch hold 170 is positioned within the swing path of the swing arm assembly 142 before the swing arm assembly 142 travels from the latched position downwardly into contact with the stop pad 122 and then upwardly to a position whereat the blade 108 is above the work-piece support surface 104. Of course, the time available for moving the latch hold 170 into the swing path can be increased by moving the stop pad 122 further away from the work-piece support surface 104 along the swing path. Such modification increases the overall height of the frame 114, particularly for embodiments with variable blade height. The increased material for the frame 114 results in increased weight. Increased size and weight are generally not desired for movable power tools. Thus, positioning the stop pad 122 closer to the work-piece support surface 104 along the swing path reduces the height of the frame 114 and the resultant weight of the table saw 100.

Figure 9:
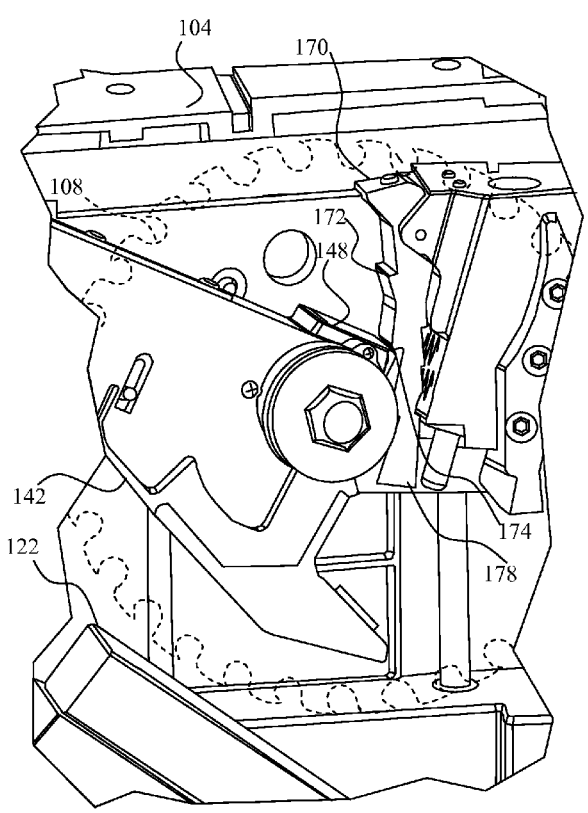
FIG. 9 depicts a partial perspective view of the swing arm assembly and latch assembly of FIG. 1 after the swing arm assembly has rebounded off of the stop pad and has been captured by a secondary latch hold ledge thereby keeping the shaping device below the surface of the work-piece support surface.

For some embodiments wherein the stop pad 122 is positioned closer to the work-piece support surface 104 along the swing path, such as the embodiment of FIG. 1, the distance between the swing arm assembly 142 in the latched position and the stop pad 122 is such that the swing arm assembly 142 contacts the stop pad 122 before the rebound plate 148 rotates beneath the rebound ledge 178. Accordingly, the rebound ledges 174 and 176 are provided at locations above the rebound ledge 178 to contact the rebound plate 148 when the swing arm assembly 142 is actuated with the carriage 124 positioned closer to the stop pad 122 as depicted in FIG. 9. In other embodiments, rebound ledges 174 and 176 may be provided as safety measures in the event the latch hold 170 does not move with the designed speed.

Figure 2:
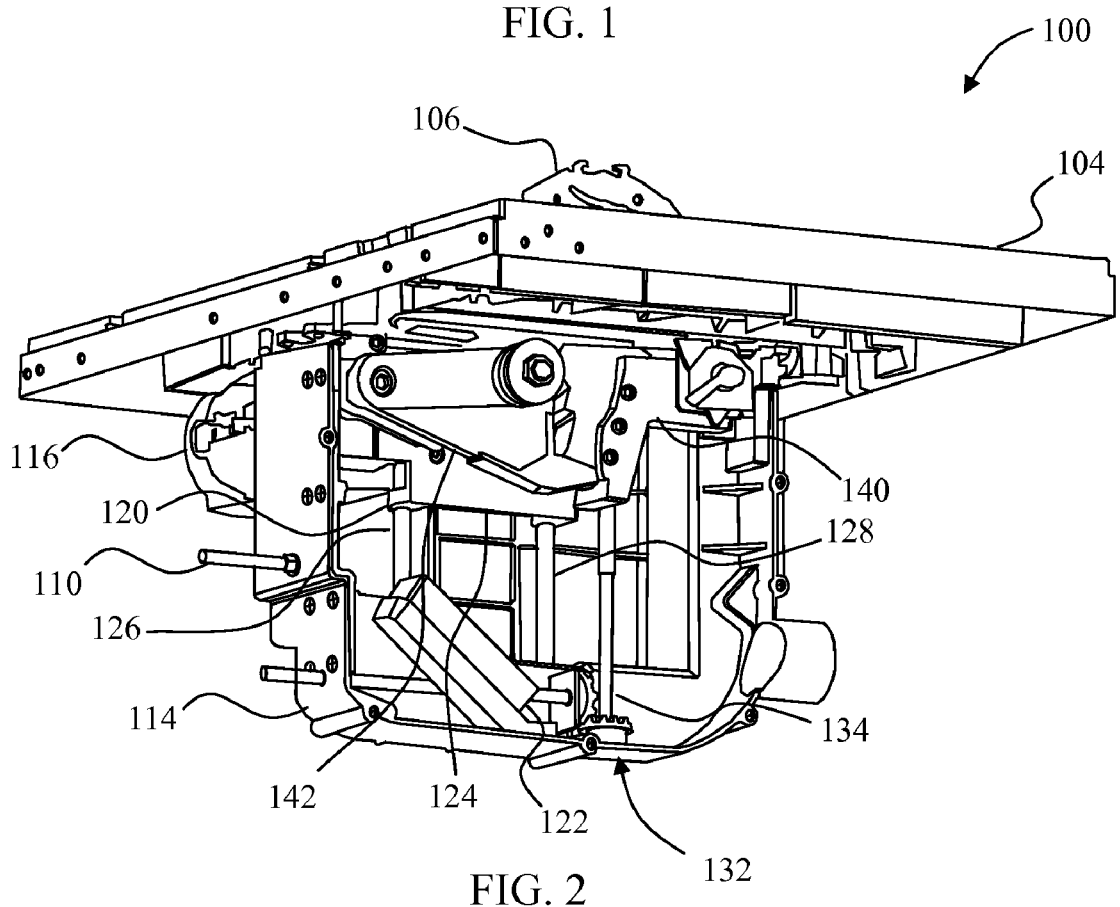
FIG. 2 depicts a bottom perspective view of the table saw of FIG. 1 with the housing removed showing a movable carriage mounted on a pivoting frame beneath the work-piece support surface.

The angle and length of the stop pad 122 are selected in the embodiment of FIG. 2 to ensure that the swing arm assembly 142 contacts the stop pad 122 at the foot 192 (see FIG. 3) regardless of the initial height of the carriage 124. Thus the foot 192 receives the force of the impact when the swing arm assembly 142 contacts the stop pad 122. Accordingly, while the materials used to form the foot 192, the strike plate 146, and the rebound plate 148 are selected to absorb multiple impacts, lighter materials may be used in other areas of the swing arm assembly 142 to minimize weight of the table saw 100.

In addition or in the alternative to a stop pad 122, the table saw 100 may include the electromagnet brake 660 of FIG. 4L. In response to a sensed condition, the controller activates the brake 660. Specifically, controller couples the electromagnet 664 to the source of electrical energy 672 to generate a magnetic field. As the swing arm assembly 142 approaches the de-latched position the magnetic field repels the plate 668. Accordingly, the kinetic energy of the swing arm assembly 142 is reduced as the plate 668 approaches the electromagnet 664, thereby preventing the swing arm assembly 142 from rebounding to the latched position upon contacting the stop pad 122.

Embodiments of the table saw 100 including a linear track 608 or a curved track 612 also move the swing arm assembly 142 to a de-latched position in response to a sensed condition. With reference to FIG. 4I, in response to a sensed condition the controller couples the coils 620 of the linear track 608 to the source of electrical energy, thereby causing the coils 620 to generate a magnetic field, which propels the magnets 616 connected to the swing arm assembly 142 in direction 624. The guide posts 628 guide the swing arm assembly 142 to the de-latched position.

Similarly, with reference to FIGS. 4J and 4K, in response to the controller sensing a condition the coils 620 are coupled to a source of electrical energy, thereby causing the coils 620 to generate a magnetic field. The magnetic field propels the magnets 616 connected to the swing arm assembly 142 in direction 504 to pivot the swing arm assembly 142 to the de-latched position. Wheels 636 roll upon rails 632 to guide the swing arm assembly 142 to the de-latched position. The wheels 636 maintain the magnets 616 a predetermined distance form the coils 620. Additionally, the wheels 636 engage the rails 632 to prevent a twist torque from damaging the swing arm assembly 142.

Once the sensed condition has been cleared, the swing arm assembly 142 is reset by moving the latch hold 170 out of the swing path. This is effected by compressing the springs 188 and 186. The swing arm assembly 142 may then be rotated in a counterclockwise direction about the output shaft 152 until the rebound plate 148 is adjacent to the upper surface of the latch hold 170. The latch hold 170 is then released and the springs 188 and 186 bias the latch hold 170 about the pivot 190 into contact with the lip 164 of the swing arm assembly 142 which restricts rotation of the latch hold 170. Additionally, the swing arm assembly 142 is maintained in a latched position with the latch pin 166 resting on the latch ledge 170 as shown in FIG. 5.

The table saw 100 thus actively monitors for an unsafe condition and initiates mitigation action automatically in the event an unsafe condition is sensed. Additionally, movement and subsequent stopping of the swing arm assembly 172 is accomplished without requiring physical contact with the blade 108. Accordingly, the blade 108 is not damaged by the mitigation action.

Moreover, because the mitigation action does not require interaction with the blade 108, the mitigation system of the table saw 100 may be used with other shaping devices such as sanding wheels, blades with varying dado blades, and molding head cutters, without requiring any modification to the mitigation system. Additionally, because the moving components of the mitigation system can be mounted on the frame 114, the mitigation system can be used with any desired blade height or bevel angle.

The mitigation system discussed with respect to the table saw 100 can be implemented using very light materials, and is thus amenable to incorporation into a variety of power tools including bench top saws and portable saws. For example, the components which are subjected to increased stress within the mitigation system, such as the solenoid pin 184, the latch hold 170, the rebound plate 148, and the strike plate 146, can be made of more durable materials including metals to withstand the impacts and stresses of activating the mitigation system. Other components, including the housings, may be fabricated from more lightweight materials to minimize the weight of the power tool.

Figure 10:
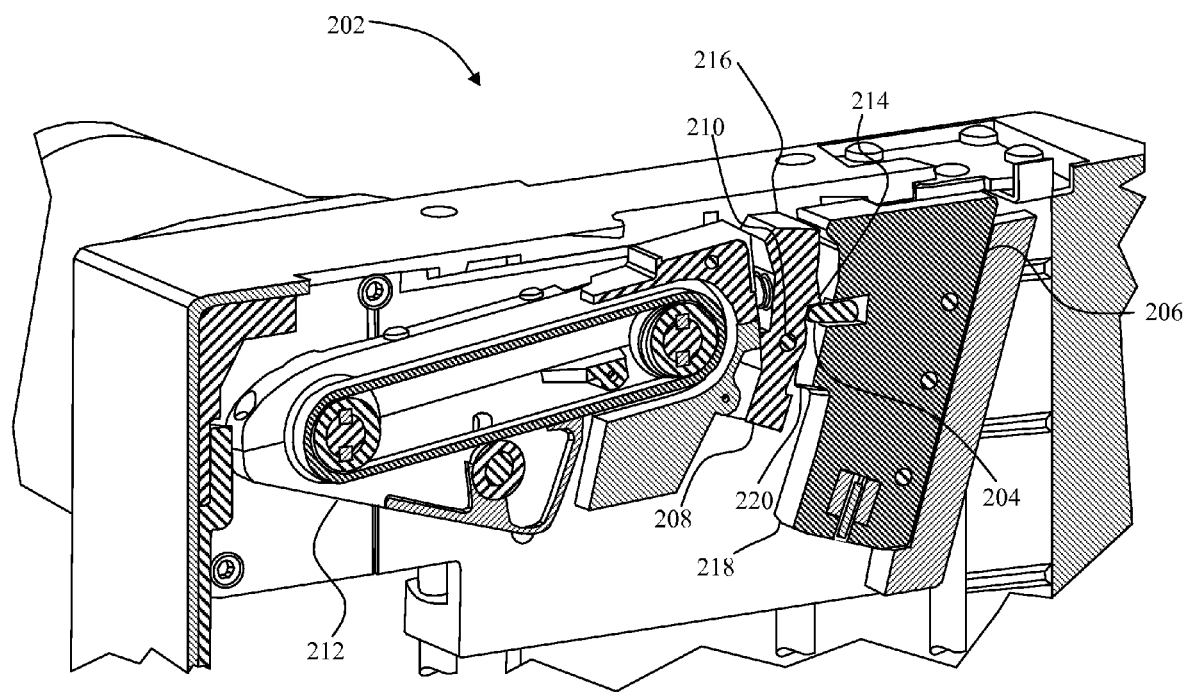
FIG. 10 depicts a partial perspective cross-sectional view of a power tool with a latching pin that does not rotate with the swing arm mechanism.

If desired, the components of the table saw 100 may repositioned within the housing 102. By way of example, FIG. 10 depicts a power tool 202 with a latch pin 204 positioned within a base 206. The latch pin 204 is biased by a spring (not shown) toward a latch hold 208 which is pivotably mounted by a pivot 210 to a swing arm assembly 212. In this embodiment, the latch hold 208 includes a latch ledge 214 and a single rebound ledge 216. The base 206 includes a rebound plate 218. An additional rebound plate 220 is provided on the base 206 as a safety measure in the event the latch hold 208 does not move with the designed speed in a manner similar to the latch hold 170. Operation of the power tool 202 as configured in the manner of FIG. 10 is substantially identical to operation of the table saw 100 as configured in FIG. 4A.

A further example of rearranged components is shown in FIG. 11, wherein a power tool 230 includes a swing arm assembly 232 mounted vertically on a carriage assembly 234 below a slot 236 in a work support surface 238. The power tool 230 further includes a solenoid 240 and a rebound latch 242, both of which are also mounted to the carriage assembly 234. The swing arm assembly 232 includes a power wheel 244 which rotates a blade wheel 246 through a belt 248. The swing arm assembly 232 further includes a strike plate 250 and a latch plate 252.

The swing arm assembly 232 is maintained in the position shown in FIG. 11 by a latch pin 254. The latch pin 254 is biased by a spring 256 into a latch recess 258 in the swing arm assembly 232. The pin 254, also shown in FIG. 12, includes a head 260 and a body 262. A bore 264 extends through the body 262 and includes an actuation ramp 266. The surface of the actuation ramp 266 is angled from an upper portion 268 of the bore 264 to a lower portion 270 of the bore 264.

The rebound latch 242 is pivotably mounted to the carriage assembly 234 by a pivot 272. A spring 274 biases the rebound latch 242 in a counter clockwise direction as viewed in FIG. 11. The rebound latch 242 includes a rebound ledge 276, a release 278, and a latch foot 280. A stop pad 282 is also mounted to the carriage assembly 234.

Figure 13:
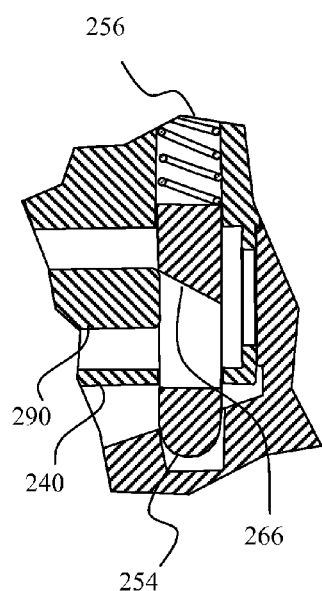
FIG. 13 depicts a partial cross-sectional view of the positive locking mechanism of FIG. 11 as a solenoid pin contacts an actuation ramp in a bore extending through the positive locking mechanism.

Operation of the power tool 230 may be substantially identical to operation of the table saw 100 through the firing of the solenoid 240. When the solenoid 240 is actuated, however, a solenoid pin 290, shown in FIG. 13, is forced outwardly from the solenoid 240 into contact with the actuation ramp 266. The shape of the solenoid pin 290 and the actuation ramp 266 forces the latch pin 254 against the spring 256. The force transferred from the solenoid 240 is sufficient to overcome the bias of the spring 256. Accordingly, the spring 256 is compressed and the pin 254 moves outwardly from the latch recess 258 to the position shown in FIG. 14.

Figure 14:
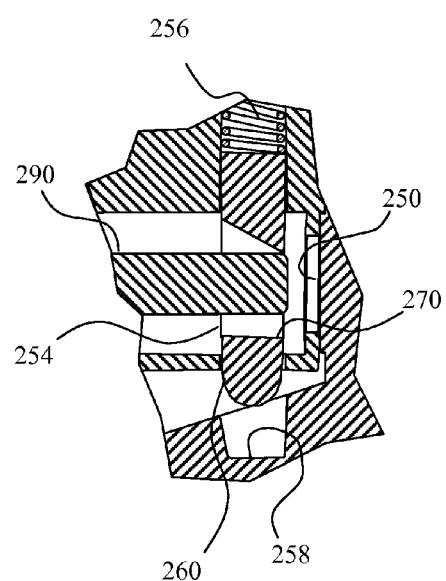
FIG. 14 depicts a partial cross-sectional view of the positive locking mechanism of FIG. 11 as a strike plate is exposed to the solenoid pin of FIG. 13 through the bore in the positive locking mechanism.

In FIG. 14, the latch pin 254 has moved to a position whereat the strike plate 250 of the swing arm assembly 232 is exposed to the solenoid pin 290 through the lower portion 270 of the bore 264. Additionally, the head 260 of the latch pin 254 has been moved to a position whereat rotation of the swing arm assembly 232 is not inhibited by the latch pin 254, even though a portion of the latch pin 254 may remain within the recess 258.

Figure 15:
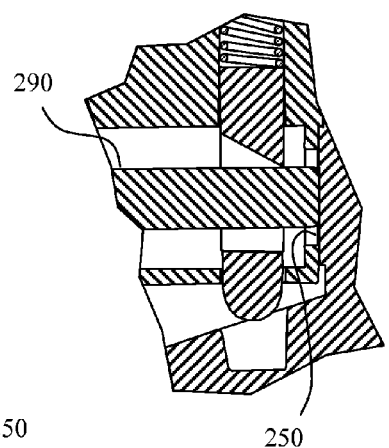
FIG. 15 depicts a partial cross-sectional view of the positive locking mechanism of FIG. 11 as the solenoid pin of FIG. 13 impacts the strike plate.
Figure 16:
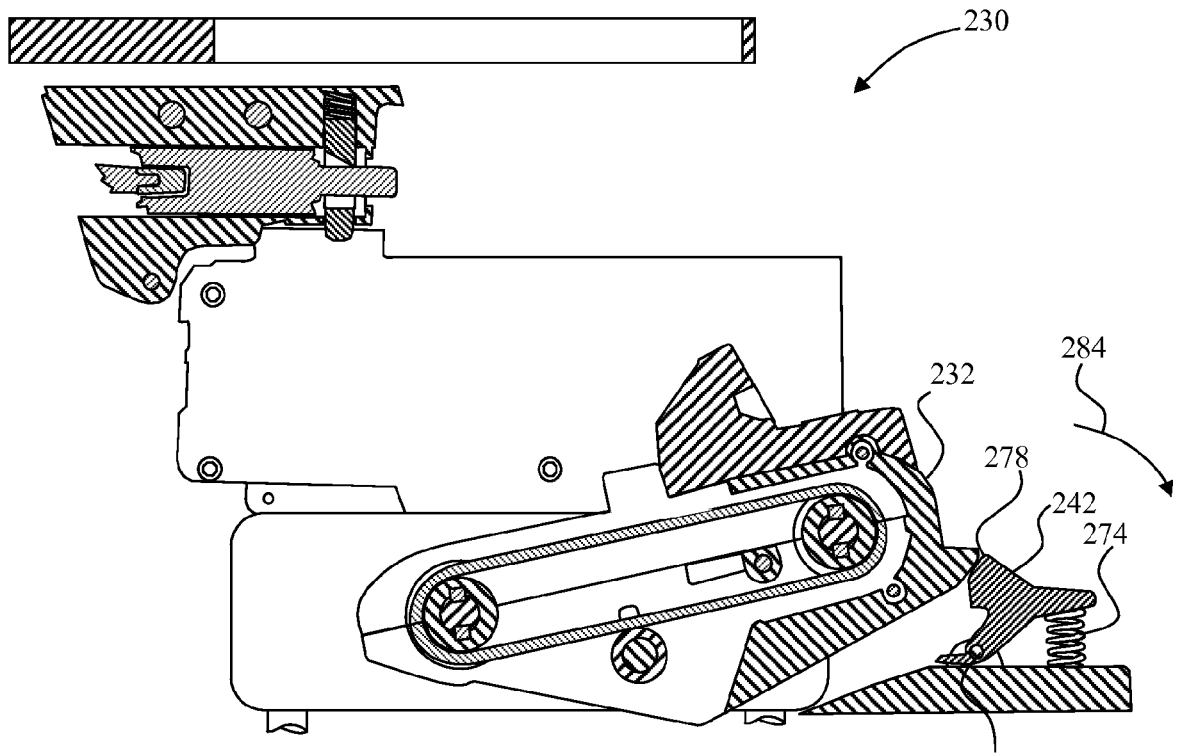
FIG. 16 depicts a partial cross-sectional view of the power tool of FIG. 11 as the swing arm assembly contacts a release on a rebound latch.

Continued movement of the solenoid pin 290 outwardly from the solenoid 240 causes the solenoid pin 290 to contact the strike plate 250 as depicted in FIG. 15. The solenoid pin 290 transfers sufficient force to the strike plate 250 to cause the swing arm assembly 232 to rotate about the power wheel 244 in a manner similar to the rotation of the swing arm assembly 142 described above. Rotation of the swing arm assembly 232 brings the swing arm assembly 232 into contact with the release 278 of the rebound latch 242 as shown in FIG. 16. The force of the swing arm assembly 232 is sufficient to overcome the bias of the spring 274 thereby rotating the rebound latch 242 about the pivot 272 in the direction of the arrow 284.

Figure 17:
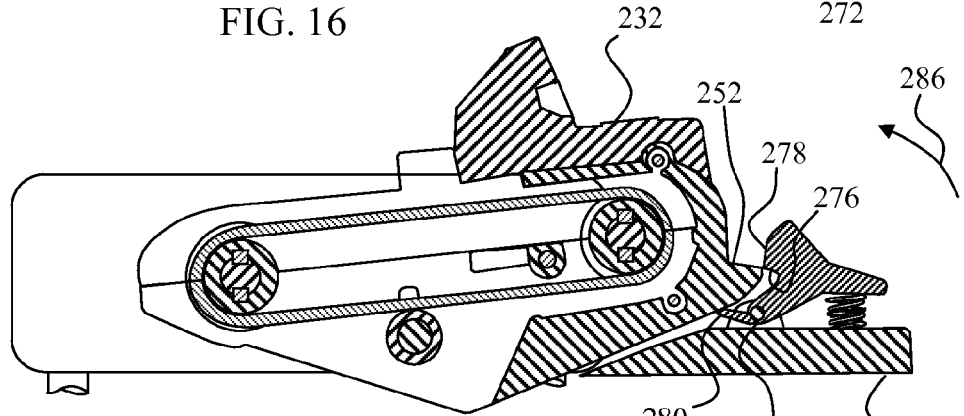
FIG. 17 depicts a partial cross-sectional view of the power tool of FIG. 11 with the swing arm assembly in contact with a latch foot on a rebound latch for automatically positioning the rebound latch to arrest rebounding of the swing arm assembly off of a stop pad.
Figure 18:
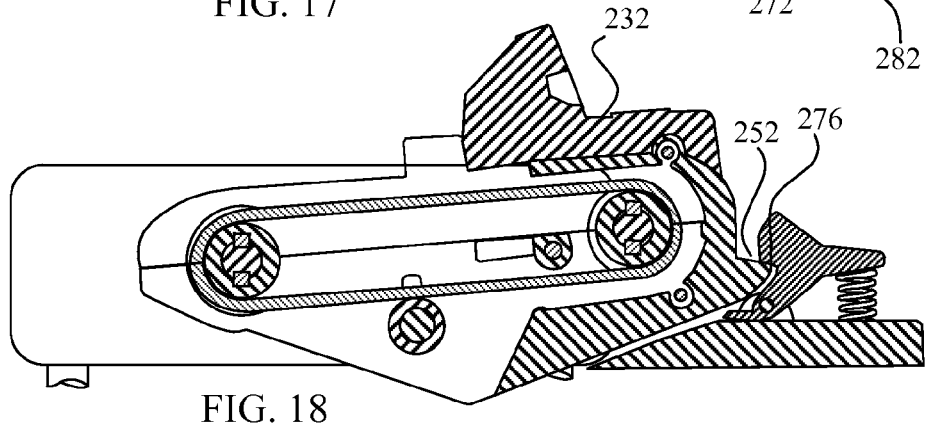
FIG. 18 depicts a partial cross-sectional view of the power tool of FIG. 11 with the swing arm assembly arrested from rebounding by the rebound latch.

Once the rebound latch 242 has rotated sufficiently, the swing arm assembly 232 slides past the release 278 and into contact with the latch foot 280 as shown in FIG. 17. Continued rotation of the swing arm assembly 232 forces the latch foot 280 downward, causing the rebound latch 242 to rotate in the direction of the arrow 286 of FIG. 17. As the rebound latch 242 rotates in the direction of the arrow 286, the rebound ledge 276 is rotated into a position above the latch plate 252 as shown in FIG. 18.

The swing arm assembly 232 then rotates into contact with the stop pad 282. In the event the swing arm assembly 232 begins to rebound off of the stop pad 282, the latch plate 252 moves into contact with the rebound ledge 276 and rotation of the swing arm assembly 232 is arrested.

Figure 19:
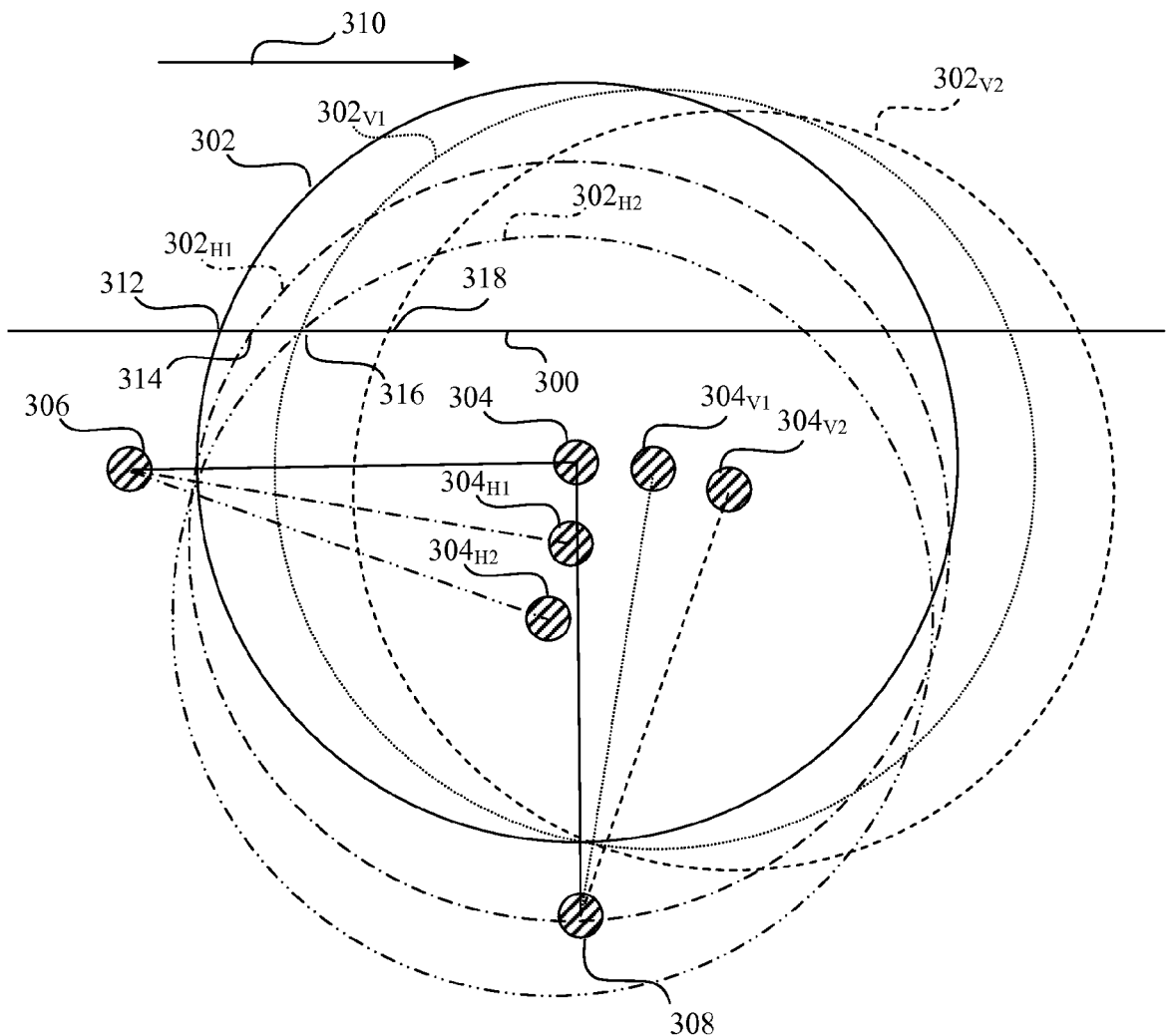
FIG. 19 depicts a schematic representation of the relative positions of a shaping tool as a horizontally mounted swing arm and a vertically mounted swing arm move a blade to a location beneath a work-piece support surface.

The vertical arm configuration of the tool 230 may be desirable in applications wherein injury is most likely to occur as a result of movement parallel to the surface of the work piece support surface. By way of example, FIG. 19 is a schematic of a work piece support surface 300 with a shaping device 302 extending above the surface of the work piece support surface 300. The shaping device 302 rotates about an axis defined by a blade wheel 304. In a horizontal swing arm configuration, the blade wheel 304 is driven by a power shaft 306. In a vertical swing arm configuration, the blade wheel 304 is driven by a power shaft 308.

A work piece, for purpose of this example, is moved by a user toward the blade 302 in the direction of the arrow 310. Thus, the point at which the user is most likely to come into accidental contact with the shaping device 302 is at or near the location 312. When accelerated such as by a solenoid 182, the blade wheel 304, in a horizontal swing arm configuration, rotates from the position indicated by the blade wheel 304 to the position indicated by the blade wheel $304_{H1}$ in a first time interval. The location of the shaping device 302 associated with the blade wheel $304_{H1}$ is blade $302_{H1}$. Thus, the blade 302 has moved from the location 312 to the location 314.

During the same time interval, the blade wheel 304, in a vertical swing arm configuration, rotates from the position indicated by the blade wheel 304 to the position indicated by the blade wheel $304_{V1}$. The location of the shaping device 302 associated with the blade wheel $304_{V1}$ is blade $302_{V1}$. Thus, the blade 302 has moved from the location 312 to the location 316. Accordingly, the blade 302 is moved farther away from the contact point 312 by the vertical configuration than by the horizontal configuration.

Likewise, the blade wheel 304, in a horizontal swing arm configuration, rotates from the position indicated by the blade wheel $304_{H1}$ to the position indicated by the blade wheel $304_{H2}$ in a second time interval. The location of the shaping device 302 associated with the blade wheel $304_{H2}$ is blade $302_{H2}$. Thus, the blade 302 has moved from the location 312 to the location 316 over two time intervals.

During the second time interval, the blade wheel 304, in a vertical swing arm configuration, rotates from the position indicated by the blade wheel $304_{V1}$ to the position indicated by the blade wheel $304_{V2}$. The location of the shaping device 302 associated with the blade wheel $304_{V2}$ is blade $302_{V2}$. Thus, the blade 302 has moved from the location 312 to the location 318. Accordingly, the blade 302 moves away from the contact point 312 by about a factor of two in the vertical configuration as compared to the horizontal configuration.

Thus, in applications wherein an injury is most likely to occur at one side of the shaping device, a vertically oriented swing arm may be used to mitigate injury. Most table saw applications will fit into this scenario if a blade guard is installed. FIG. 19 similarly illustrates that the horizontal swing arm configuration moves the blade downwardly at a faster rate. Thus, in applications wherein the injury is most likely to occur at the top of the shaping device, a horizontal swing arm configuration may be used to mitigate injury.

As described above, operation of the latch pin 254 is significantly different from operation of the latch pin 166. Specifically, the latch pin 166 is operated by applying a force to the swing arm assembly 142. In contrast, the latch pin 254 is relatively immune to activation by application of force to the swing arm assembly 232. Accordingly, the latch pin 254 is a positive locking mechanism that is not susceptible to unintentional unlocking absent complete failure of the latch pin 254. The latch pin 254 may thus be used in swing arms that are positioned in any desired orientation.

Figure 20:
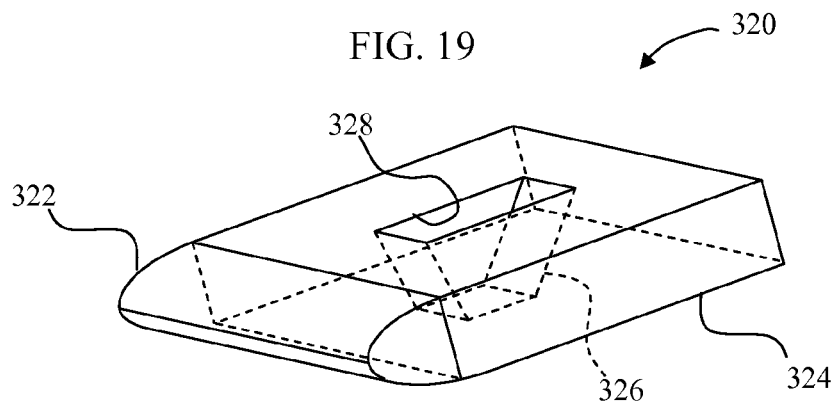
FIG. 20 depicts a perspective view of a positive locking mechanism which automatically aligns an actuating ramp with an actuator.

A variety of positive locking mechanisms, i.e., mechanisms wherein a latch is moved prior to application of rotational force to the swing arm assembly, may be incorporated into power tools. One example of another positive locking mechanism is the latch pin 320 of FIG. 20. The latch pin 320 includes a head 322 and a body 324. The latch pin 320 further includes an actuation ramp 326 within a bore 328. While the latch pin 320 is similar to the latch pin 254, the body 324 of the latch pin 320 is substantially wider than the cylindrical body 262 of the latch pin 254. Thus, the bore 328 of the latch pin 320 is easily maintained in alignment with a solenoid pin. Additionally, a non-cylindrical body such as the body 324 may provide enhanced alignment of the swing arm with which the body 324 is used.

Figure 21:
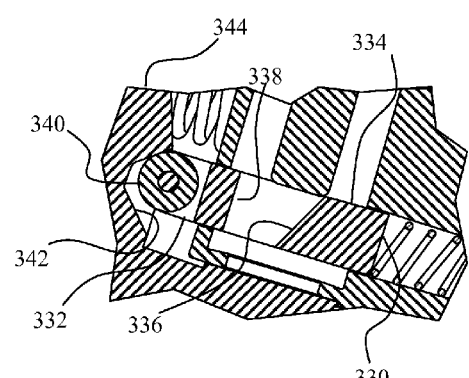
FIG. 21 depicts a cross-sectional view of a positive locking mechanism with a roller that reduces wear of the mechanism and which can be used to reduce movement of a latched swing arm assembly.

Another positive locking mechanism is the latch pin 330 of FIG. 21. The latch pin 330 includes a head 332 and a body 334. The body 334 may be any desired shape including rectangular or cylindrical. The latch pin 330 further includes an actuation ramp 336 within a bore 338. The latch pin 330 also includes a wheel 340 rotatably mounted in the head 332. The wheel 340 reduces wear on the latch pin 330. Additionally, the wheel 340 in this embodiment is configured to contact only one side of a recess 342 in a swing arm 344. Accordingly, by providing another member which limits the upward or counter-clockwise travel of the swing arm 344, the wheel 340 is used to "pinch" the swing arm 344 to reduce or eliminate undesired movement of the swing arm 344.

Figure 22:
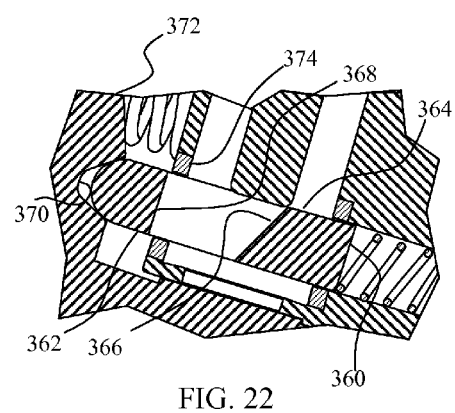
FIG. 22 depicts a cross-sectional view of a positive locking mechanism which can be used to reduce movement of a latched swing arm assembly.

Another positive locking mechanism is the latch pin 360 of FIG. 22. The latch pin 360 includes a head 362 and a body 364. The body 364 may be any desired shape including rectangular or cylindrical. The latch pin 360 further includes an actuation ramp 366 within a bore 368. The head 362 in this embodiment is configured to contact opposing tapered sides of a recess 370 in a swing arm 372. Accordingly, seating of the head 362 in the recess 370 eliminates undesired movement of the swing arm 372. Further reduction in non-axial movement of the latch pin 360 while permitting axial movement for locking and unlocking the swing arm 372 is provided by oil impregnated bushings 374.

Figure 23:
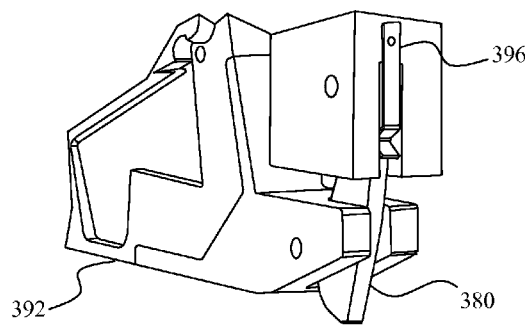
FIGS. 23 and 24 depict a positive locking mechanism which engages a pin in a swing arm assembly and with an actuation ramp extending from the body of the mechanism, and which rotates about an axis of rotation that is not parallel to the axis along which a solenoid pin moves.
Figure 24:
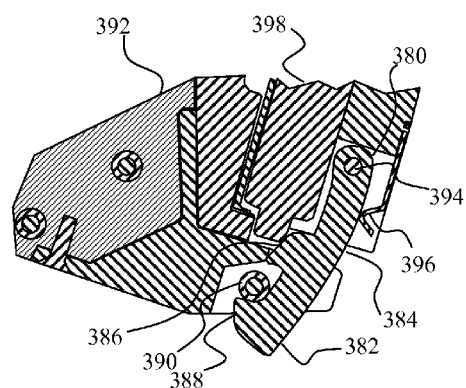

A positive locking mechanism may also be provided in the form of rotating latch pin such as the latch pin 380 depicted in FIGS. 23 and 24. The latch pin 380 includes a head 382 and a body 384. The latch pin 380 further includes an actuation ramp 386 extending from the body 384. The head 382 includes a hook portion 388 which engages a retaining pin 390 in a swing arm 392. The latch pin 380 is pivotably supported by a pivot pin 394 and biased toward the retaining pin 390 by a spring 396. When the hook portion 388 engages the retaining pin 390, the actuation ramp 386 is aligned with a solenoid pin 398.

In operation, movement of the solenoid pin 398 causes the solenoid pin 398 to impinge the actuation ramp 386 of the latch pin 380 imparting a rotational force to the latch pin 380. The actuation ramp 386 thus converts axial force from the solenoid pin 398 to a rotational force. The rotational force overcomes the bias of the spring 396 causing the latch pin 380 to rotate in a counterclockwise direction about the pivot pin 394. The shape of the hook portion 388 and the retaining pin 390 along with the location of the hook portion 388 relative to the pivot pin 394 is selected to ensure that an upward force is not imparted onto the retaining pin 390 from the latch pin 384 during this rotation. Once the actuation ramp 386 has rotated sufficiently, the solenoid pin 398 continues to move axially into contact with the swing arm 392.

Figure 25:
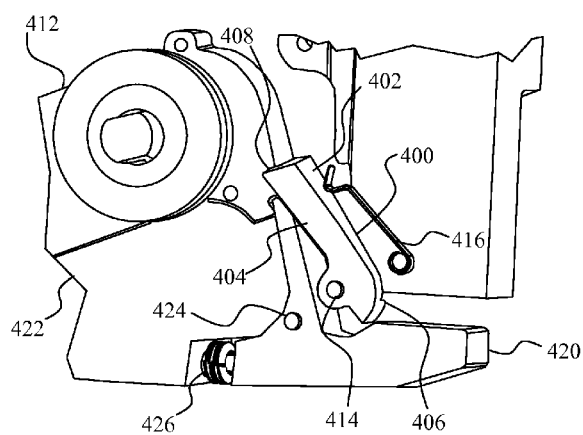
FIGS. 25 and 26 depict a positive locking mechanism which engages a recess in a swing arm assembly and with an actuation ramp defined in the body of the mechanism, and which rotates about an axis of rotation that is not parallel to the axis along which a solenoid pin moves.
Figure 26:
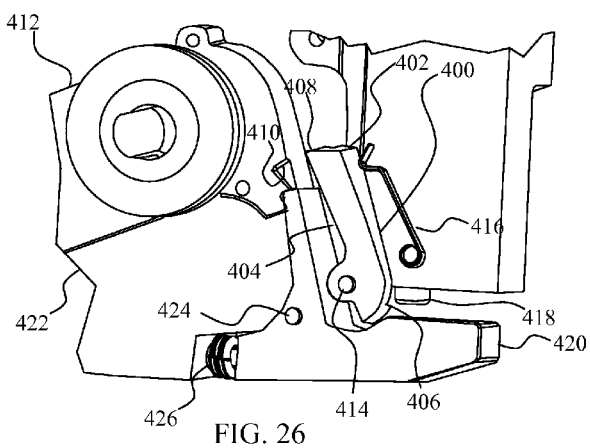

The latch pin 400 depicted in FIGS. 25 and 26 is another positive locking mechanism in the form of rotating latch pin. The latch pin 400 includes a head 402 and a body 404. The latch pin 400 further includes an actuation ramp 406 extending from the body 404. The head 402 includes a lip portion 408 which engages a retaining recess 410 in a swing arm 412. The latch pin 400 is pivotably supported by a pivot pin 414 and biased toward the retaining recess 410 by a spring 416. When the lip portion 408 engages the retaining pin 410, the actuation ramp 416 is aligned with a solenoid pin 418.

In operation, movement of the solenoid pin 418 causes the solenoid pin 418 to impinge the actuation ramp 406 of the latch pin 400 imparting a rotational force to the latch pin 400. The rotational force overcomes the bias of the spring 416 causing the latch pin 400 to rotate in a clockwise direction about the pivot pin 414. The shape of the lip portion 408 and the retaining recess 410 along with the location of the lip portion 408 relative to the pivot pin 414 is selected to ensure that an upward force is not imparted onto the retaining recess 410 from the latch pin 404 during this rotation. Once the actuation ramp 406 has rotated sufficiently, the solenoid pin 418 continues to move axially into contact with the swing arm 412.

The solenoid pin 418 in this embodiment impinges a strike plate portion 420 which is pivotably attached to a lower swing arm housing 422 by a pivot pin 424. Spring washers 426 positioned between the strike plate portion 420 and the lower swing arm housing 422 bias the strike plate portion 420 into a position aligned with the solenoid pin 418 when the lip portion 408 is within the retaining recess 410. When the solenoid pin 418 impacts the strike plate portion 420, the spring washers 426 are compressed thereby reducing the peak force that is transferred from the strike plate portion 420 to the other components of the swing arm 412. This allows lighter materials to be used for some components of the swing arm 412 while ensuring a rapid acceleration of the swing arm 412.

Figure 27:
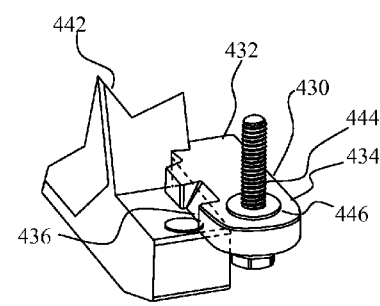
FIGS. 27 and 28 depict a positive locking mechanism which engages a recess in a swing arm assembly and with an actuation ramp defined in the body of the mechanism, and which rotates about an axis of rotation that is parallel to the axis along which a solenoid pin moves.
Figure 28:
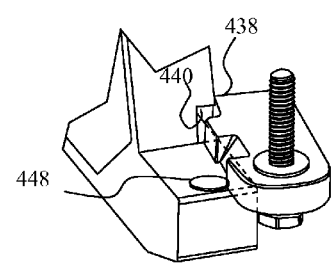

The latch pin 430 depicted in FIGS. 27 and 28 is another positive locking mechanism in the form of rotating latch pin. The latch pin 430 includes a head 432 and a body 434. The latch pin 430 further includes an actuation ramp 436 extending into the body 434. The head 432 includes a lip portion 438 which engages a retaining recess 440 in a swing arm 442. The latch pin 430 is pivotably supported by a pivot pin 444 and biased toward the retaining recess 440 by a radial spring 446. When the lip portion 438 engages the retaining pin 440, the actuation ramp 446 is aligned with a solenoid pin (not shown). If desired, a second latch pin, substantially identical to the latch pin 430, may be provided in opposition to the latch pin 430.

In operation, movement of the solenoid pin (not shown) causes the solenoid pin (not shown) to impinge the actuation ramp 436 of the latch pin 430 and the axial force is translated into a rotational force by the actuating ramp 436 imparting a rotational force to the latch pin 430. The rotational force overcomes the bias of the spring 446 causing the latch pin 430 to rotate in a clockwise direction about the pivot pin 444 and outwardly from the swing arm 442. Once the actuation ramp 436 has rotated sufficiently, the solenoid pin (not shown) continues to move axially into contact with a strike plate 448 on the swing arm 412.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

The invention claimed is:
1. A table saw, comprising:
a latch hold mechanism;
a swing arm pivotable about a pivot axis along a swing arm path between a first swing arm position and a second swing arm position so as to move a shaping member away from a work piece support surface;
a latch movable between a first latch position whereat the swing arm is maintained at the first swing arm position and a second latch position whereat the swing arm is not maintained at the first swing arm position;
an actuating device configured to transfer a force to the swing arm when the swing arm is maintained at the first swing arm position resulting in a bias on the latch in a direction toward the second latch position;
at least one swing path guide extending adjacent to the swing arm path;
at least one swing path tracker positioned to be in opposition to the at least one swing path guide along the pivot axis at a location radially outwardly of a bearing assembly supporting the swing arm such that a twist torque on the swing arm is opposed by the swing path guide; and
a control system configured to control the actuating device to transfer a force to the swing arm when the swing arm is maintained at the first swing arm position sufficient to move the latch from the first latch position to the second latch position.

2. The table saw of claim 1, wherein the at least one swing path tracker comprises:
a flange positioned proximate to the pivot axis.

3. The table saw of claim 2, wherein the flange extends completely about the pivot axis in a plane parallel to a plane in which the swing arm pivots.

4. The table saw of claim 3, wherein the at least one swing path guide comprises:
- a friction reducing plate extending completely about the pivot axis.

5. The table saw of claim 1, wherein the at least one swing path tracker comprises:
- a spacer bar extending from the swing arm; and
- a shaped tracking portion, and wherein the at least one swing path guide comprises:
- a recess including a blade side wall and a wall opposite to the blade side wall, the recess shaped complementary to the shaped tracking portion.

6. The table saw of claim 5, wherein the shaped tracking portion comprises a neck portion and a head portion, the head portion having a width in a plane parallel to a plane in which the swing arm pivots that is greater than the maximum width of the neck portion.

7. The table saw of claim 6, wherein the recess comprises:
- a slot having a width larger than the maximum width of the neck portion, the slot dividing the blade side wall into a first blade side wall portion and a second blade side wall portion.

8. The table saw of claim 7, wherein the at least one swing path tracker further comprises:
- a flange positioned proximate to the pivot axis.

9. The table saw of claim 8, further comprising:
- a latch ledge on the latch hold mechanism for contact with the latch when the latch is in the first latch position, the latch ledge shaped complementary to the latch.

10. The table saw of claim 9, wherein the latch ledge comprises a planar portion shaped complementary to a planar portion of the latch.

11. A power tool comprising:
- a work piece support surface;
- a shaping device support shaft automatically retractable along a retraction path in a retraction path plane from a first shaft position to a second shaft position in response to a sensed condition, wherein the second shaft position is more distal to the work piece support surface than the first shaft position;
- a latch pin movable between a first latch pin position whereat the shaping device support shaft is maintained at the first shaft position and a second latch pin position whereat the shaping device support shaft is not maintained at the first shaft position;
- at least one retraction path guide extending adjacent to the retraction path;
- at least one retraction path tracker located radially outwardly of a bearing about which a swing arm supporting the shaping device support shaft pivots and positioned to be in opposition to the at least one retraction path guide along an axis perpendicular to the retraction path plane such that a twist torque on the swing arm is opposed by the retraction path guide; and
- a control system configured to cause the actuator to generate a force causing the latch pin to move from the first latch pin position toward the second latch pin position in response to a sensed condition.

12. The power tool of claim 11, wherein the at least one retraction path tracker comprises:
- a flange positioned proximate to a pivot axis about which the swing arm supporting the shaping device support shaft moves.

13. The power tool of claim 12, wherein the flange extends completely about the pivot axis in a plane parallel to a plane in which the swing arm pivots.

14. The power tool of claim 12, wherein the at least one retraction path guide comprises:
- a friction reducing plate extending completely about the pivot axis.

15. The power tool of claim 11, wherein the at least one retraction path tracker comprises:
- a spacer bar extending perpendicularly to the retraction path; and
- a shaped tracking portion, and wherein the at least one retraction path guide comprises:
- a recess including a first wall proximate to the shaping device support shaft and a second wall opposite to the blade side wall, the recess shaped complementary to the shaped tracking portion.

16. The power tool of claim 15, wherein the shaped tracking portion comprises a neck portion and a head portion, the head portion having a width in a plane parallel to a plane defined by the retraction path that is greater than the maximum width of the neck portion.

17. The power tool of claim 16, wherein the recess comprises:
- a slot having a width larger than the maximum width of the neck portion, the slot dividing the first wall into a first side wall portion and a second side wall portion.

18. The power tool of claim 15, wherein the at least one retraction path tracker further comprises:
- a flange positioned proximate to a pivot axis about which the swing arm supporting the shaping device support shaft moves.

19. The power tool of claim 11, further comprising:
- a latch ledge for contact with the latch pin when the latch pin is in the first latch pin position, the latch ledge shaped complementary to the latch pin.

20. The power tool of claim 19, wherein the latch ledge comprises a planar portion shaped complementary to a planar portion of the latch pin.

* * * * *